US012597284B2

(12) United States Patent
Kolavennu et al.

(10) Patent No.: US 12,597,284 B2
(45) Date of Patent: Apr. 7, 2026

(54) IMAGE READING SYSTEMS, METHODS AND STORAGE MEDIUM FOR PERFORMING ENTITY EXTRACTION, GROUPING AND VALIDATION

(71) Applicant: U.S. Bank National Association, Minneapolis, MN (US)

(72) Inventors: Soumitri Naga Kolavennu, Plymouth, MN (US); Raj M. Bharadwaj, Plymouth, MN (US); Priyanka Singhal, Atlanta, GA (US); Varshini Sriram, Minneapolis, MN (US); Lavanya Basavaraju, Minneapolis, MN (US)

(73) Assignee: U.S. Bank National Association, Minneapolis, MN (US)

( * ) Notice: Subject to any disclaimer, the term of this patent is extended or adjusted under 35 U.S.C. 154(b) by 370 days.

(21) Appl. No.: 18/357,655

(22) Filed: Jul. 24, 2023

(65) Prior Publication Data

US 2023/0368557 A1    Nov. 16, 2023

Related U.S. Application Data

(63) Continuation-in-part of application No. 17/569,121, filed on Jan. 5, 2022, now Pat. No. 12,014,561.

(60) Provisional application No. 63/169,789, filed on Apr. 1, 2021.

(51) Int. Cl.
*G06V 30/414* (2022.01)
*G06V 10/84* (2022.01)

(52) U.S. Cl.
CPC ............ *G06V 30/414* (2022.01); *G06V 10/84* (2022.01)

(58) Field of Classification Search
None
See application file for complete search history.

(56) References Cited

U.S. PATENT DOCUMENTS

| | | | | |
|---|---|---|---|---|
| 8,548,902 B2 * | 10/2013 | Porter | ................ | G06F 16/2379 |
| | | | | 707/804 |
| 10,324,969 B2 * | 6/2019 | Maitra | ............... | G06F 16/3344 |
| 10,579,653 B2 | 3/2020 | Daher et al. | | |
| 10,922,484 B1 * | 2/2021 | Pereira | ................. | G06F 40/279 |
| 11,170,179 B2 * | 11/2021 | Mills | ....................... | G06F 40/40 |
| 11,514,321 B1 * | 11/2022 | Chen | ...................... | G06N 3/096 |
| 11,599,516 B1 | 3/2023 | Sorenson | | |
| 11,914,621 B2 * | 2/2024 | Blalock | ................... | G06F 18/22 |
| 12,417,409 B2 * | 9/2025 | Iyengar | ................. | G06N 20/20 |
| 12,524,809 B1 * | 1/2026 | Krull | ...................... | G06Q 40/04 |

(Continued)

OTHER PUBLICATIONS

Burdick, D., Hernández, M., Ho, H., Koutrika, G., Krishnamurthy, R., Popa, L. C., . . . & Das, S. R. (2015). Extracting, linking and integrating data from public sources: A financial case study. Available at SSRN 2666384. (Year: 2015).*
Anand, Guru Subramanian, et al. "Deep learning for information extraction in finance documents—corporate loan operations." 2020 11th IEEE Annual Information Technology, Electronics and Mobile Communication Conference (IEMCON). IEEE, 2020. (Year: 2020).*

(Continued)

*Primary Examiner* — Michelle M Entezari Hausmann
(74) *Attorney, Agent, or Firm* — Merchant & Gould P.C.

(57) ABSTRACT

Entity extraction is performed using a voting ensemble approach to enhance the accuracy and effectiveness of entity extraction processes. Voting ensemble weights are stored. In turn, a prediction value for a first entity is determined from multiple models that are specifically trained for entity extraction. A plurality of first entity prediction values is obtained. The model with the highest prediction value among the plurality of first entity prediction values is then selected.

20 Claims, 17 Drawing Sheets

(56) References Cited

U.S. PATENT DOCUMENTS

| 2010/0146473 | A1 |    | 6/2010  | Srivastave  |             |
|--------------|----|----|---------|-------------|-------------|
| 2017/0352041 | A1 | *  | 12/2017 | Ramamurthy  | G06N 5/043  |
| 2018/0129944 | A1 |    | 5/2018  | Meunier et al. |          |
| 2019/0156115 | A1 |    | 5/2019  | Cohen et al. |            |
| 2019/0286691 | A1 |    | 9/2019  | Sidhani et al. |          |
| 2019/0370397 | A1 | *  | 12/2019 | Kummamuru   | G06F 40/295 |
| 2020/0151591 | A1 | *  | 5/2020  | Li          | G06N 5/046  |
| 2020/0234183 | A1 | *  | 7/2020  | Ghatage     | G06N 5/025  |
| 2020/0242348 | A1 |    | 7/2020  | Ast         |             |
| 2021/0074398 | A1 | *  | 3/2021  | Fong        | G16H 15/00  |
| 2021/0224568 | A1 |    | 7/2021  | Zhang       |             |
| 2022/0277858 | A1 | *  | 9/2022  | Zhao        | G16H 50/20  |
| 2022/0319216 | A1 |    | 10/2022 | Kolavennu   |             |
| 2023/0056987 | A1 | *  | 2/2023  | Hunter      | G06F 16/9024 |
| 2023/0153335 | A1 |    | 5/2023  | McNeill     |             |
| 2025/0068845 | A1 | *  | 2/2025  | Patel       | G06V 30/10  |

OTHER PUBLICATIONS

Peng, Dezhi, et al., "Pagenet: Towards end-to-end weakly supervised page-level handwritten chinese text recognition." International Journal of Computer Vision 130.11 (2022): 2623-2645.

Scholch, Lukas, et al., "Towards Automatic Parsing of Structured Visual Content through the Use of Synthetic Data." 2022 26th International Conference on Pattern Recognition (ICPR). IEEE, 2022, 7 pages.

Suwa, Misako, "Segmentation of connected handwritten numerals by graph representation." Eighth International Conference on Document Analysis and Recognition (ICDAR'05). IEEE, 2005, 5 pages.

He, K., et al., "Mask R-CNN," Facebook AI Research (FAIR), arXiv:1703.06870v3 [cs.CV] Jan. 24, 2018, 12 pages.

Kataria, S., et al., "Automatic Extraction of Data Points and Text Blocks from 2-Dimensional Plots in Digital Documents," Association for the Advancement of Artificial Intelligence (www.aaai.org) 2008, 6 pages.

* cited by examiner

200

| Receive an Unstructured Document | 202 |

| Preprocess the Unstructured Document | 204 |

| Recognize Textual Blocks | 206 |

| Generate Bounding Boxes | 208 |

| Determine Search Paths | 210 |

| Generate a Graph Representation | 212 |

700

702 — Review, By the Descriptive Linguistic Engine, the Generated Graph Representation 704 — Regenerate, By the Geometric Engine, the Graph Representation 206 — Recognize Textual Blocks 208 — Generate Bounding Boxes 210 — Determine Search Paths 212 — Generate a Graph Representation

800

802 — Obtain, from the Descriptive Linguistic Analyzer, Target Textual Block Pair(s)

804 — Search the Graph Representation, Along the Search Paths, to Identify the Target Textual Block Pair(s)

806 — Output the Identified Target Textual Block Pair(s)

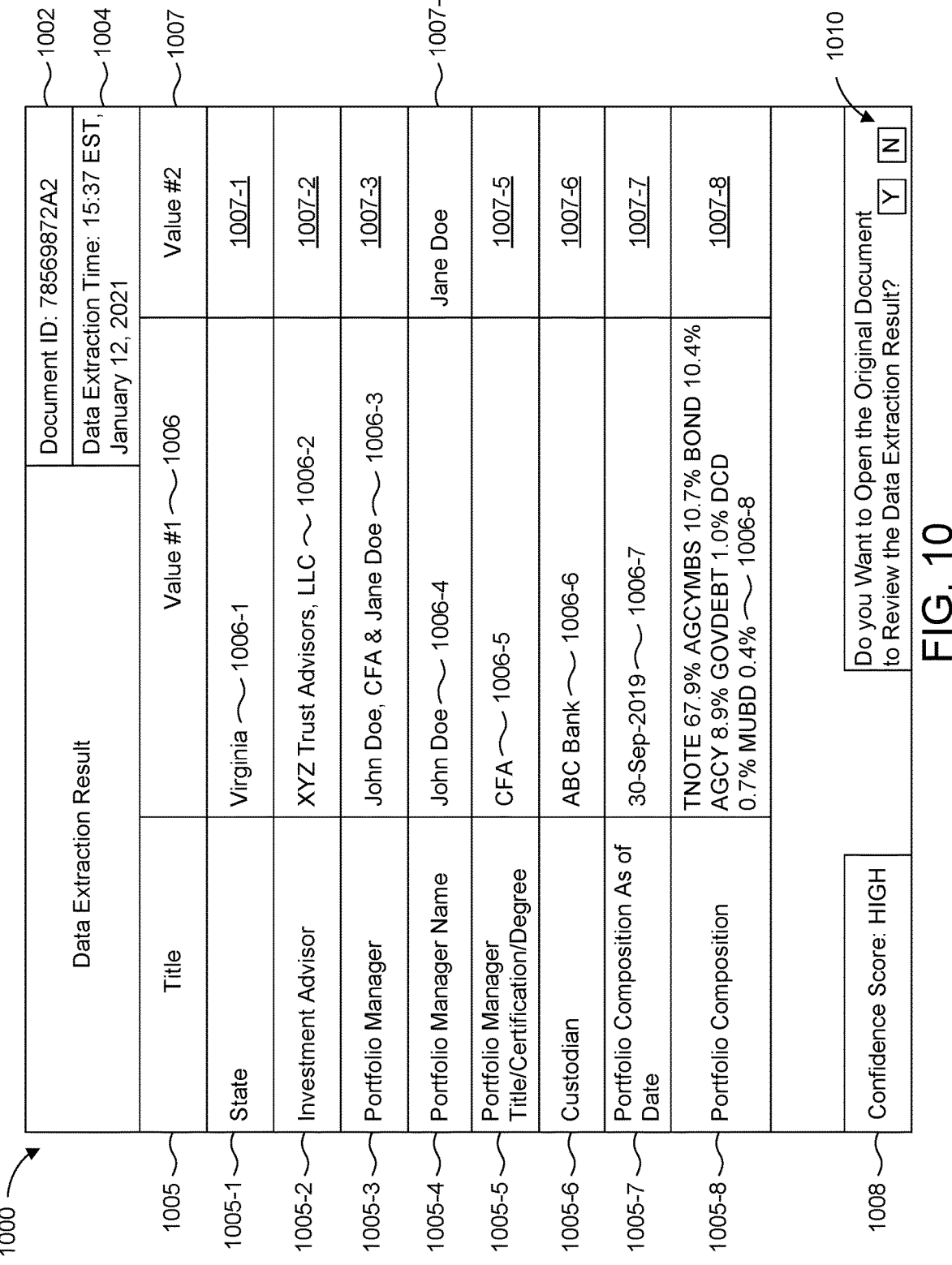

| Data Extraction Result | Document ID: 78569872A2 | |
| --- | --- | --- |
| | Data Extraction Time: 15:37 EST, January 12, 2021 | |
| Title | Value #1 ~1006 | Value #2 ~1007 |
| State | Virginia ~ 1006-1 | 1007-1 |
| Investment Advisor | XYZ Trust Advisors, LLC ~ 1006-2 | 1007-2 |
| Portfolio Manager | John Doe, CFA & Jane Doe ~ 1006-3 | 1007-3 |
| Portfolio Manager Name | John Doe ~ 1006-4 | Jane Doe ~1007-4 |
| Portfolio Manager Title/Certification/Degree | CFA ~ 1006-5 | 1007-5 |
| Custodian | ABC Bank ~ 1006-6 | 1007-6 |
| Portfolio Composition As of Date | 30-Sep-2019 ~ 1006-7 | 1007-7 |
| Portfolio Composition | TNOTE 67.9% AGCYMBS 10.7% BOND 10.4% AGCY 8.9% GOVDEBT 1.0% DCD 0.7% MUBD 0.4% ~ 1006-8 | 1007-8 |

Confidence Score: HIGH ~1008

Do you Want to Open the Original Document to Review the Data Extraction Result?  [Y] [N] ~1010

FIG. 10

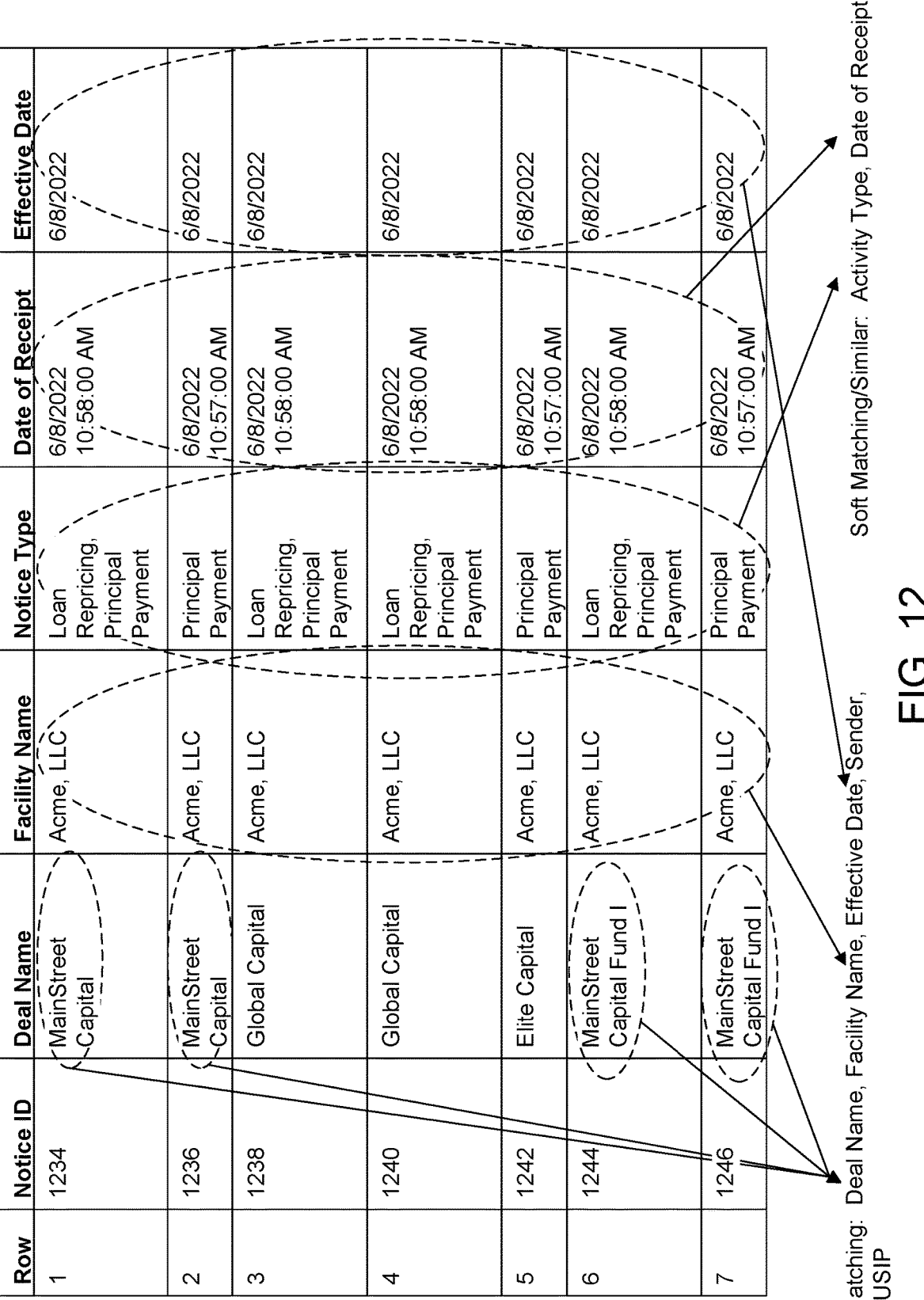

| Row | Notice ID | Deal Name | Facility Name | Notice Type | Date of Receipt | Effective Date |
|---|---|---|---|---|---|---|
| 1 | 1234 | MainStreet Capital | Acme, LLC | Loan Repricing, Principal Payment | 6/8/2022 10:58:00 AM | 6/8/2022 |
| 2 | 1236 | MainStreet Capital | Acme, LLC | Principal Payment | 6/8/2022 10:57:00 AM | 6/8/2022 |
| 3 | 1238 | Global Capital | Acme, LLC | Loan Repricing, Principal Payment | 6/8/2022 10:58:00 AM | 6/8/2022 |
| 4 | 1240 | Global Capital | Acme, LLC | Loan Repricing, Principal Payment | 6/8/2022 10:58:00 AM | 6/8/2022 |
| 5 | 1242 | Elite Capital | Acme, LLC | Principal Payment | 6/8/2022 10:57:00 AM | 6/8/2022 |
| 6 | 1244 | MainStreet Capital Fund I | Acme, LLC | Loan Repricing, Principal Payment | 6/8/2022 10:58:00 AM | 6/8/2022 |
| 7 | 1246 | MainStreet Capital Fund I | Acme, LLC | Principal Payment | 6/8/2022 10:57:00 AM | 6/8/2022 |

Matching: Deal Name, Facility Name, Effective Date, Sender, CUSIP

Soft Matching/Similar: Activity Type, Date of Receipt

FIG. 12

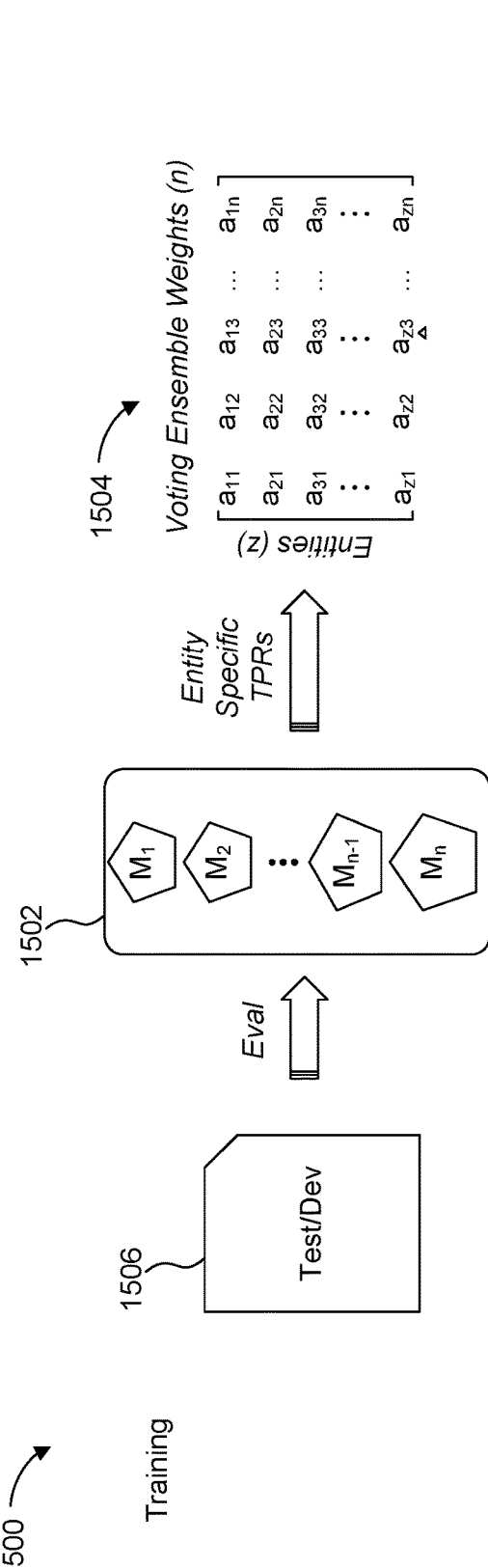
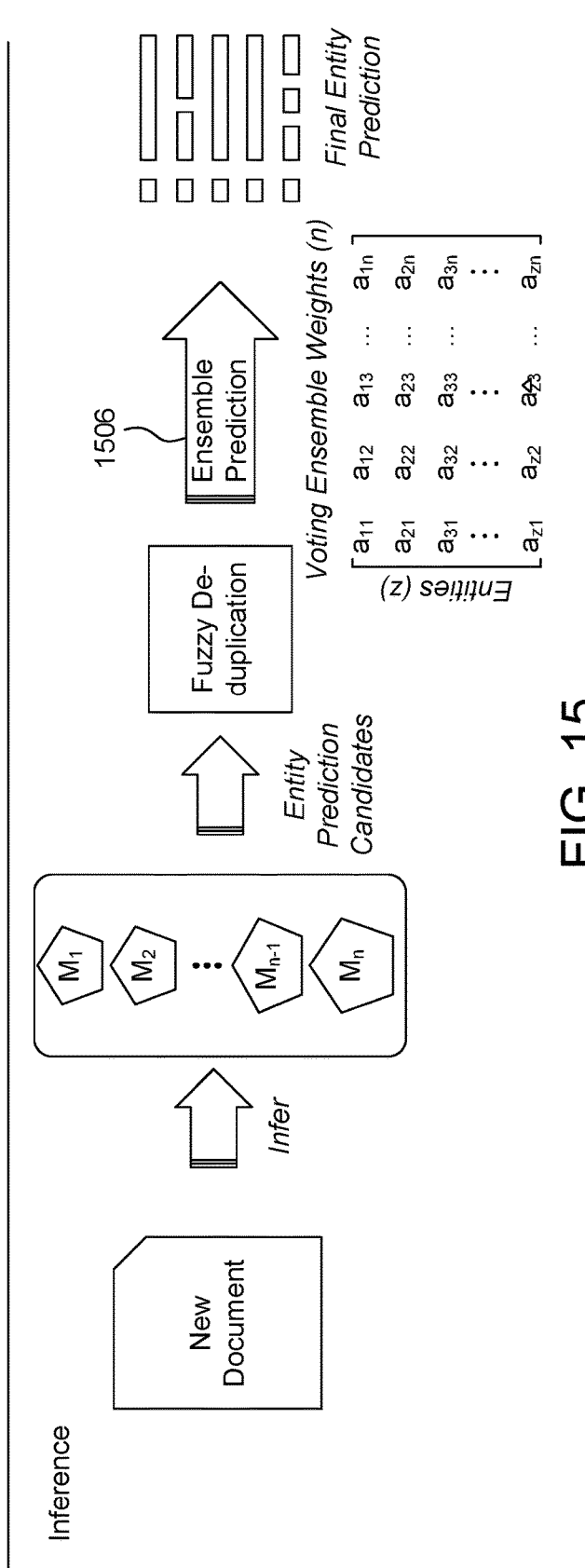
FIG. 15

1700

| Entities | Test Accuracy |
|---|---|
| ORIGINATION_DATE | 92% |
| BORROWER_NAME | 85% |
| AGREEMENT_TYPE | 92% |
| BORROWER_ADDRESS | 91% |
| PRINCIPAL | 90% |
| MATURITY_DATE | 70% |
| LENDER_NAME | 80% |
| REFERENCE_RATE_SOURCE | 100% |
| REFERENCE_RATE | 100% |
| SPREAD_MARGIN | 86% |
| GOVERNING_LAW_STATE | 100% |
| 1_ABR | 83% |
| RATE_RESET_FREQUENCY | 83% |
| LENDER_ADDRESS | 100% |
| DAY_COUNT_CONVENTION | 80% |
| RATE_FLOOR | 100% |
| INTEREST_PAYMENT_DATE | 100% |
| PAYMENT_FREQUENCY | 67% |
| Grand Total | 89% |

IMAGE READING SYSTEMS, METHODS AND STORAGE MEDIUM FOR PERFORMING ENTITY EXTRACTION, GROUPING AND VALIDATION

CROSS-REFERENCE TO RELATED APPLICATION

This application is a continuation-in-part of U.S. patent application Ser. No. 17/569,121, filed Jan. 5, 2022, which claims the benefit of provisional application 63/169,789, filed on Apr. 1, 2021. These applications are hereby incorporated herein by reference in their entirety for any and all purposes.

TECHNICAL FIELD

Aspects described herein include an image reading system, a control method for controlling an image reading system, and a storage medium having stored therein a control method for performing entity extraction, grouping and validation.

BACKGROUND

Traditional image reading systems, commonly known as scanners, convert printed characters on paper documents into digital text using optical character recognition (OCR) software. The information extracted from the paper documents is easier to archive, search, share and use, which enables faster and more intelligent decisions. However, re-creating form-type documents into a structured digital format is usually performed manually, which is time-consuming, tedious, and undesirable for users.

Form-type documents (also referred to as forms, form templates or templates) can be in paper or electronic format. It is common for forms, for example, to be scanned into a digital format using an image reading system as described above. Typical image reading systems scan the form merely to generate an image version of it. Subsequently re-creating these forms into a structured digital format is usually performed manually, which is time consuming, tedious, and undesirable for users. Newer systems include recognition tools that can assist with this problem by performing analysis and data extraction on the image scan.

In contrast, electronic forms may include information pertaining to their structure, for example to indicate regions in which particular input fields are to be displayed. They can also include controls which behave differently depending on how users interact with them. For example, when a user selects a check box, a particular section may appear. Conversely, the section may disappear when the user clears the checkbox.

There exist multitudes of paper and electronic forms, however, that do not include well defined structures. This is, in part, because the information on forms can oftentimes be unstructured. Unstructured data (also referred to as unstructured information) is information that either does not have a pre-defined data model or is not organized in a pre-defined manner. Unstructured data is usually text-heavy, but may contain data such as names, dates, and numbers, to name a few. Irregularities and ambiguities in unstructured data make it difficult to understand using traditional OCR mechanisms as compared to data stored in fielded form such as data stored in databases or annotated in documents.

Generic methods that operate on unstructured form-like documents are limited in terms of what they can perform with respect to data extraction. Most require human intervention because unstructured form-like documents are neither in prose nor arranged structurally in a database that a typical form scanner or OCR processor or post processor can make sense of. Such interventions may involve a user manually extracting data points referred to as entities, which is particularly problematic in the financial industry, where financial institutions such as banks, credit unions investment firms, insurance companies, and others use form-like documents that need to be filled out or otherwise obtained and grouped together.

The documents can be several pages long and can contain, for example, 500 paragraphs per agreement. In many cases, an original document (e.g., a loan agreement) is followed by multiple amendments. This set of documents could be termed as a document family, where the underlying transaction is built for document families rather than any single, original document.

Natural Language Processing (NLP) has been used together with various computational techniques, such as machine learning, to analyze and generate human language data, such as text. In order to utilize NLP techniques, sometimes an additional step of optical character recognition (OCR) is required. While current OCR techniques are generally accurate, they may still contain spelling and typographical errors. This presents a challenge for machine learning models, which rely on a limited set of tokens to create embeddings. In NLP, "UNK" stands for "unknown" and refers to a special token used by a tokenizer when it encounters a word that is not present in its vocabulary. When a word is not recognized, the tokenizer replaces it with the "UNK" token, which is a placeholder that represents any unknown word. This allows the model to process text even if it contains words that it has not seen before. However, the use of "UNK" tokens can affect the performance of the model, as it may not be able to understand the meaning of the unknown words and may produce inaccurate or incomplete results.

In the domain of lending, a loan notice document is a formal written communication sent by a lender to a borrower regarding their loan. Typically, it contains important information about the loan, including the amount borrowed, the interest rate, the repayment schedule, and any fees associated with the loan. However, the information on a loan notice may vary, depending on the specific lender and the type of loan being offered. A loan notice document may further include a facility name, an activity type, an effective date, and a deal name. Usually, a user manually extracts necessary entities. Extracting necessary entities from loan notices is currently done manually, which can be time-consuming and prone to errors. A user may also be required to go through several of such loan notices for the purpose of grouping multiple loan notices together.

Entity extraction, also referred to as named entity recognition (NER), is a type of natural language processing technology that enables computers to analyze text as it is naturally written. NER systems are designed to identify and classify entities such as people, organizations, locations, and other objects in unstructured text data. However, current NER systems face several challenges, including operating at the word, sentence or paragraph level rather than the document level, not identifying all relevant entities in a document, struggling with disambiguation, and difficulty identifying and grouping related entities. For example, typical NER systems may not be able to identify all relevant entities in a given document, particularly if the entities are referred to in a non-standard way or in a context that is not immediately apparent. For example, there may be words used in documents, such as "disbursements" in a loan notice document, that are not recognized as tokens in a model's vocabulary. This can lead to incomplete or inaccurate grouping of entities.

Additionally, there can be issues with disambiguation of entities that have the same name or similar names, but refer to different individuals or organizations. This can lead to confusion and errors in grouping entities or documents together.

NER systems can struggle with identifying and grouping entities that are related in more subtle or complex ways, such as when two organizations are subsidiaries of a larger parent company, or when a person is associated with multiple organizations in different roles.

Cross-validation is a common technique used to evaluate the performance of NER systems by testing them on data that is distinct from the data used to train the system. While cross-validation can be an effective way to assess the generalizability of an NER system, there are several potential problems that can arise. One problem with cross-validation in NER is that the distribution of entities may be different in the validation set compared to the training set. This can lead to overfitting, where the NER system performs well on the training data but poorly on the validation data because it has not learned to generalize to new and unseen data. Another issue is that cross-validation may not be representative of the full range of variation in the data, which can limit the generalizability of the NER system. For example, the validation set may not include certain types of entities or may not include enough examples of certain entity types, which can lead to inaccurate performance metrics.

These limitations make cross-validating and automatically correcting entities technically challenging. It is difficult if not impossible to perform cross-validating with, for example, a system of record that serves as the authoritative source, if the entity relationships are not well established.

Additionally, process exceptions often prevent the delivery of desired process outputs, and manual processes pose significant security issues.

Therefore, there is a need for a system and method for automated data extraction and validation from unstructured form-like documents and document grouping that overcomes the limitations of current NER systems and manual processes.

SUMMARY

In general terms, this disclosure is directed to an image reading system, a control method for controlling an image reading system, and a storage medium having stored therein a control method for performing geometric extraction. One aspect includes a method for processing a document having one or more pages, comprising: receiving an unstructured document; recognizing a plurality of textual blocks on at least a portion of a page of the unstructured document; generating a plurality of bounding boxes, each bounding box surrounding and corresponding to one of the plurality of textual blocks and having coordinates of a plurality of vertices; determining a plurality of search paths, each search path having coordinates of two endpoints and connecting at least two bounding boxes; and generating a graph representation of the at least a portion of the page, the graph representation including the plurality of textual blocks, the coordinates of the plurality of vertices of each bounding box and the coordinates of the two endpoints of each search path.

In some embodiments, the plurality of search paths include a plurality of horizontal search paths and a plurality of vertical search paths.

The at least two bounding boxes, in some embodiments, include a first bounding box, a second bounding box, and at least one intermediate bounding box between the first bounding box and the second bounding box. The plurality of horizontal search paths and the plurality of vertical search paths can also span across a plurality of pages of the unstructured document.

The plurality of bounding boxes, in some embodiments, are rectangular bounding boxes; and the plurality of vertices are one of: four vertices of each rectangular bounding box, and two opposite vertices of each rectangular bounding box.

In some embodiments, the plurality of bounding boxes are generated by a machine learning kernel, and the plurality of search paths are determined by the machine learning kernel.

In some embodiments, the method further comprises obtaining, from a descriptive linguistics engine, a plurality of target textual block pairs, each target textual block pair including a title textual block and at least one corresponding value textual block; searching the graph representation, along the plurality of search paths, to identify at least one of the target textual block pairs; and outputting the identified at least one of the target textual block pairs. The plurality of target textual block pairs can be generated by the machine learning kernel.

In some embodiments, the searching includes, in order: locating a first textual block; searching the graph representation, starting from the first textual block and along one of the plurality of horizontal search paths; and searching the graph representation, starting from the first textual block and along one of the plurality of vertical search paths.

In some embodiments, the method further includes searching the graph representation until a predetermined criterion is met. In some embodiments, searching the graph representation can be stopped after one of the target textual block pairs is identified. In some embodiments, searching the graph representation can stop after a first number of textual blocks have been searched.

In some embodiments, a non-transitory computer-readable medium is provided which stores instructions. When the instructions are executed by one or more processors, the processors operate to perform the methods herein.

In another aspect of the invention, there is provided a system for extracting data from a document having one or more pages, comprising: a processor; an input device configured to receive an unstructured document; a machine learning kernel coupled to the processor; a geometric engine coupled to the machine learning kernel and configured to: recognize a plurality of textual blocks on at least a portion of a page of the unstructured document; generate a plurality of bounding boxes, each bounding box surrounding and corresponding to one of the plurality of textual blocks and having coordinates of a plurality of vertices; determine a plurality of search paths, each search path having coordinates of two endpoints and connecting at least two bounding boxes; and generate a graph representation of the at least a portion of the page, the graph representation including the plurality of textual blocks, the coordinates of the plurality of vertices of each bounding box, and the coordinates of the two endpoints of each search path; a descriptive linguistic engine coupled to the machine learning kernel and configured to: generate a plurality of target textual block pairs, each target textual block pair including a title textual block and at least one corresponding value textual block; and search the graph representation, along the plurality of search paths, to identify at least one of the target textual block pairs; and an output device configured to output the identified at least one of the target textual block pairs.

The plurality of search paths can include a plurality of horizontal search paths and a plurality of vertical search paths. The plurality of horizontal search paths and the plurality of vertical search paths can span across a plurality of pages of the unstructured document.

The descriptive linguistics engine can further be configured to search the graph representation until a predetermined criterion is met.

The plurality of bounding boxes can be rectangular bounding boxes; and the plurality of vertices are one of: four vertices of each rectangular bounding box, and two opposite vertices of each rectangular bounding box.

The plurality of bounding boxes can be generated by a machine learning kernel, and the plurality of search paths are determined by the machine learning kernel. The descriptive linguistics engine can also obtain a plurality of target textual block pairs, each target textual block pair including a title textual block and at least one corresponding value textual block; The system can also search the graph representation along the plurality of search paths to identify at least one of the target textual block pairs and output the identified at least one of the target textual block pairs.

In some embodiments, the plurality of target textual block pairs are generated by the machine learning kernel.

The system can further operate to, in order: locate a first textual block; search the graph representation, starting from the first textual block and along one of the plurality of horizontal search paths; and search the graph representation, starting from the first textual block and along one of the plurality of vertical search paths.

The system can also operate to stop searching the graph representation after one of the target textual block pairs is identified. The system can also operate to stop searching the graph representation after a first number of textual blocks have been searched.

In some embodiments, a method for performing entity extraction is provided. The method involves storing a plurality of voting ensemble weights; determining a first entity prediction value for each of a plurality of models trained to extract a first entity, thereby determining a plurality of first entity prediction values; and selecting a first model having the highest prediction value of the plurality of first entity prediction values.

In some embodiments, the method further involves extracting, from a document, an entity:value pair corresponding to the first entity using a first ensemble weight associated with the first model.

In some embodiments, the method further involves determining a second entity prediction value for each of the plurality of models, wherein the plurality of models have been trained to extract a second entity, thereby determining a plurality of second entity prediction values; selecting a second model having the highest prediction value of the plurality of second entity prediction values; extracting, from a document, an entity:value pair corresponding to the first entity using a first ensemble weight associated with the first model; extracting, from the document, an entity:value pair corresponding to the second entity using a second ensemble weight associated with the second model.

The method, in some embodiments, further involves selecting a second model having a prediction value within a predetermined threshold of the first model; and extracting, from a document, an entity:value pair corresponding to the first entity using a first ensemble weight associated with the first model and a second ensemble weight associated with the second model.

In some embodiments, the method further involves selecting a first set of models, each of the models in the first set of models having a prediction value within a predetermined threshold of the first model, and wherein the first set of models include the first model; selecting a second set of models, wherein the second set of models does not include a model in the first set of models; extracting, from a document, a first entity:value pair corresponding to the first entity using one or more ensemble weights associated with the first set of models; and extracting, from the document, a second entity:value pair corresponding to the first entity using one or more ensemble weights associated with the second set of models.

In some embodiments, the method further involves calculating the plurality of voting ensemble weights for each of the plurality of models in a voting ensemble based on the performance of each of the plurality of models measured by accuracy.

In some embodiments, selecting the first model further comprises determining a confidence score for each of the plurality of models trained to extract the first entity; and selecting the first model with the highest confidence score among the plurality of first entity prediction values.

A system for performing entity extraction is also described. The system includes, a storage device, a plurality of models, a determination component, and a selection model. The storage device stores a plurality of voting ensemble weights; the plurality of models are trained to extract a first entity; the determination module is configured to determine a first entity prediction value for each of the plurality of models, thereby determining a plurality of first entity prediction values; and the selection module is configured to select a first model having the highest prediction value of the plurality of first entity prediction values.

In some embodiments, the system further comprises an extraction module configured to extract, from a document, an entity:value pair corresponding to the first entity using a first ensemble weight associated with the first model.

In some embodiments, the system further comprises a determination module configured to determine a second entity prediction value for each of a plurality of models trained to extract a second entity, thereby determining a plurality of second entity prediction values; a selection module configured to select a second model having the highest prediction value of the plurality of second entity prediction values; and an extraction module configured to extract, from a document, an entity:value pair corresponding to the first entity using a first ensemble weight associated with the first model and to extract, from the document, an entity:value pair corresponding to the second entity using a second ensemble weight associated with the second model.

In some embodiments, the system further comprises a selection module configured to select a second model having a prediction value within a predetermined threshold of the first model; and an extraction module configured to extract, from a document, an entity:value pair corresponding to the first entity using a first ensemble weight associated with the first model and a second ensemble weight associated with the second model.

In some embodiments, the system further comprises a selection module configured to select a first set of models, each of the models in the first set of models having a prediction value within a predetermined threshold of the first model, wherein the first set of models includes the first model; a selection module configured to select a second set of models, wherein the second set of models does not include a model in the first set of models; an extraction module configured to extract, from a document, a first entity:value pair corresponding to the first entity using one or more ensemble weights associated with the first set of models; and an extraction module configured to extract, from the document, a second entity:value pair corresponding to the first entity using one or more ensemble weights associated with the second set of models.

In some embodiments, the system further comprises a calculation module configured to calculate a plurality of voting ensemble weights for each of the plurality of models in a voting ensemble based on the performance of each of the plurality of models measured by accuracy.

In some embodiments, the selection model is further configured to: determine a confidence score for each of the plurality of models trained to extract the first entity; and select the first model with the highest confidence score among the plurality of first entity prediction values.

In yet another aspect of the embodiments described herein, a non-transitory computer-readable medium having stored thereon one or more sequences of instructions for causing one or more processors to perform the methods described herein.

BRIEF DESCRIPTION OF THE DRAWINGS

FIG. 10 is a data extraction result corresponding to the document of FIG. 9.

FIG. 12 illustrates a database record containing records extracted from multiple documents according to an example implementation.

FIG. 15 illustrates an example ensemble framework according to an example embodiment.

FIG. 17 illustrates a table showing extraction accuracy for a plurality of entities, according to an example embodiment.

DETAILED DESCRIPTION

Figure 1:
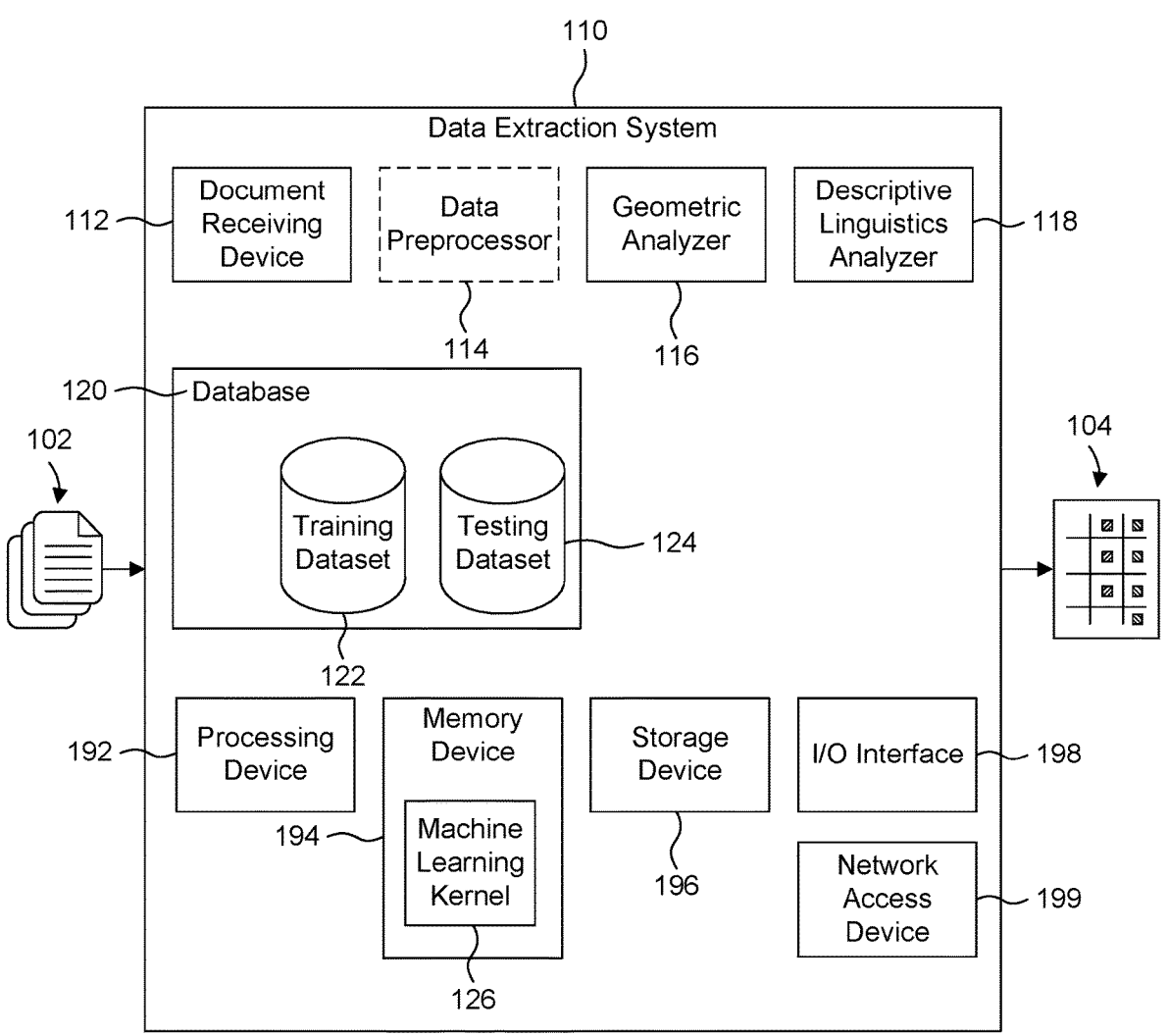
FIG. 1 is a diagram illustrating a data extraction system according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Technology herein can addresses problems of the prior art, such as by introducing an image reading system, a control method for controlling an image reading system, and a storage medium having stored therein a control method for performing geometric extraction. In an example use case, the systems, methods, and computer products described herein perform computer-aided information extraction from generic form-like documents automatically without human intervention. Aspects of embodiments described herein provide artificial intelligence systems and methods that read these documents securely.

Technology herein can also addresses problems of the prior art by further introducing automation of grouping documents (e.g., notices) according to the extracted entities, cross-validating the extracted entities with a system of record, correcting entities as necessary, and spawning exception processes. In an example use case, the systems, methods, and computer products described herein perform computer-aided grouping, cross-validation, correction, and spawning of exception processes without human intervention.

Form-like documents can vary. Examples of form-like documents include receipts, application forms, rental application forms, mortgage application forms, medical records, doctor prescriptions, restaurant menus, pay stubs, patent Application Data Sheets (ADS), trade documents, SEC filings (e.g., Form 10-K), company annual reports, company earnings reports, IRS tax forms (e.g., Form W-2, Form 1040, etc.), invoices, and bank statements. Some form-like documents like IRS tax forms are templatic, while other form-like documents such as company annual reports are non-templatic or multi-templatic. Aspects of the embodiments described herein are agnostic to the type of document.

A document can include one or more pages. Further, a document need not be a physical document. For example, a document may be an electronic document. An electronic document also may be in various formats such as Portable Document Format (PDF), spreadsheet format such as the Excel Open XML Spreadsheet (XLSX) file format, a web-form such as HTML form that allows a user to enter data on a web page that can be sent to a server for processing. Webforms can resemble paper or database forms because web users fill out the forms using checkboxes, radio buttons, or text fields via web pages displayed in a web browser. An electronic document may be stored either on a local electronic device such as a mobile device, personal computer (PC), or on an online database accessible from the Internet.

FIG. 1 is a diagram illustrating a data extraction system 110 according to an example embodiment. Generally, the data extraction system 110 is used to receive a document 102, extract data from the document 102, and generate a data extraction result 104. As described above, the document 102 can include one or more pages, and the document 102 can be either physical or electronic in various formats.

In the example of FIG. 1, the data extraction system 110 includes a document receiving device 112, a geometric analyzer 116, a descriptive linguistics analyzer 118, a database 120, a processing device 192, a memory device 194, a storage device 196, and an input/output (I/O) interface 198. In some embodiments, data extraction system 110 include a data preprocessor 114. It should be noted that the data extraction system 110 may include other components not expressly identified here.

In some embodiments, document receiving device 112 receives document 102. In cases where document 102 is a physical document, the document receiving device 112 may be a document intake mechanism that moves the document through the data extraction system 110. In cases where the document 102 is an electronic document, the document receiving device 112 may be a component that is configured to communicate with a sender of the document to receive the electronic document. For simplicity, document 102 is a one-page document unless otherwise indicated. It should be understood, however, that the example embodiments described herein are equally applicable to a multi-page document.

The received document 102 may be preprocessed by the data preprocessor 114 once it is received by the document receiving device 112. The data preprocessor 114 preprocess the received document 102 by carrying out one or more preprocessing steps that facilitate data extraction that occurs later. The preprocessing steps can include one or more of the following: (i) scanning; (ii) optical character recognition (OCR); (iii) page segmentation; (iv) intra-page segmentation; and (v) storing the preprocessed document.

The geometric analyzer 116 and descriptive linguistics analyzer 118 work together to recognize, extract and associate data from document 102. Generally, geometric analyzer 116 generates a graph representation of document 102 based on geometric characteristics of the document 102, whereas the descriptive linguistics analyzer 118 provides information on what specific information contained in the document are relevant. A graph representation, as used herein, is a mathematical structure used to model pairwise relations between objects. For example, a graph in this context can be made up of vertices (also called nodes or points) which are connected by edges (also called links or lines). Additionally, the descriptive linguistics analyzer 118 may also be used to review the graph representation generated by the geometric analyzer 116 and provide guidance on how to correct or adjust the graph representation, if necessary.

In some embodiments, geometric analyzer 116 and descriptive linguistics analyzer 118 are coupled to a machine learning kernel 126. Details of the geometric analyzer 116, the descriptive linguistics analyzer 118, and the machine learning kernel 126 are described below with reference to FIGS. 2-10.

In an example embodiment, the processing device 192 includes one or more central processing units (CPU). In other embodiments, the processing device 192 may additionally or alternatively include one or more digital signal processors, graphics processing units (GPUs), artificial intelligence processors, field-programmable gate arrays, or other electronic circuits as needed.

The memory device 194, coupled to a bus, operates to store data and instructions to be executed by processing device 192, geometric analyzer 116 and/or descriptive linguistics analyzer 118. The memory device 194 can be a random access memory (RAM) or other dynamic storage device. The memory device 194 also may be used for storing temporary variables (e.g., parameters) or other intermediate information during execution of instructions to be executed by processing device 192, geometric analyzer 116 and/or descriptive linguistics analyzer 118. As shown in FIG. 1, the machine learning kernel 126 is stored in the memory device 194. It should be noted that the machine learning kernel 126 may alternatively be stored in a separate memory device in some implementations. A non-limiting example of a machine learning kernel is a machine learning model itself as well as the supporting libraries and functions that support training and use of the model.

The storage device 196 may be a nonvolatile storage device for storing data and/or instructions for use by processing device 192, geometric analyzer 116 and/or descriptive linguistics analyzer 118. The storage device 196 may be implemented, for example, with a magnetic disk drive or an optical disk drive. In some embodiments, the storage device 196 is configured for loading contents of the storage device 196 into the memory device 194.

I/O interface 198 includes one or more components which a user of the data extraction system 110 can interact. The I/O interface 198 can include, for example, a touch screen, a display device, a mouse, a keyboard, a webcam, a microphone, speakers, a headphone, haptic feedback devices, or other like components.

The network access device 199 operates to communicate with components outside the data extraction system 110 over various networks. Examples of the network access device 199 include one or more wired network interfaces and wireless network interfaces. Examples of such wireless network interfaces of the network access device 199 include wireless wide area network (WWAN) interfaces (including cellular networks) and wireless local area network (WLANs) interfaces. In other implementations, other types of wireless interfaces can be used for the network access device 199.

The database 120 is configured to store data used by machine learning kernel 126, geometric analyzer 116, and/or descriptive linguistics analyzer 118. As shown in FIG. 1, database 120 includes at least one training dataset 122 and at least one testing dataset 124. The machine learning kernel 126 uses the training dataset 122 to train the machine learning model(s) and uses the testing dataset 124 to test the machine learning model(s). After many iterations, the machine learning kernel 126 becomes better trained for performing its part in data extraction. Database 120 can also store new data related to the document 102, such as data related to document 102 or data extraction result 104 that is entered by a user. Database 120 can thus be dynamic and accumulate additional data over time.

Figure 2:
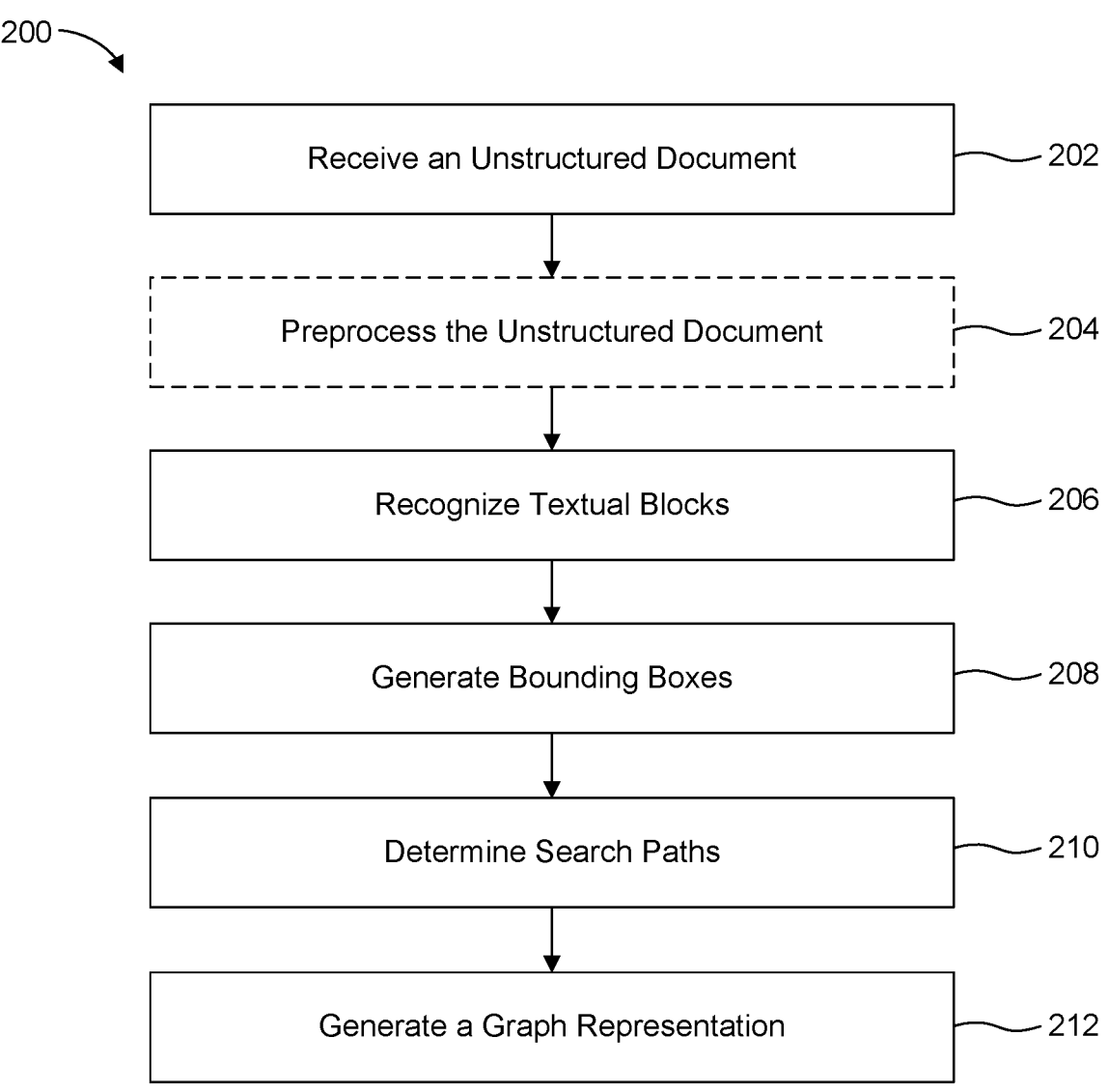
FIG. 2 is a flowchart diagram illustrating a process of processing a document according to an example embodiment.
Figure 3:
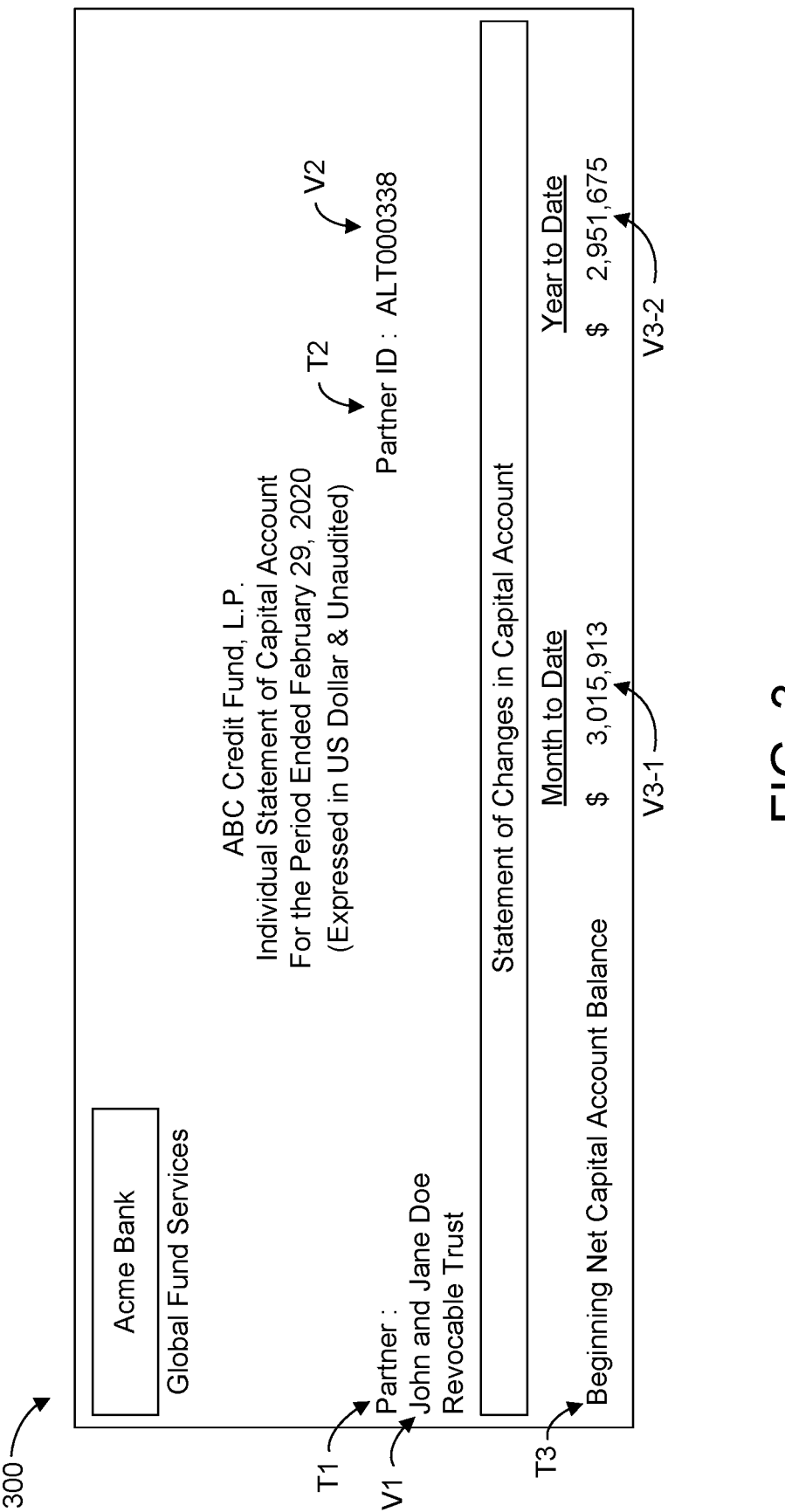
FIG. 3 is a diagram illustrating an example document.
Figure 4:
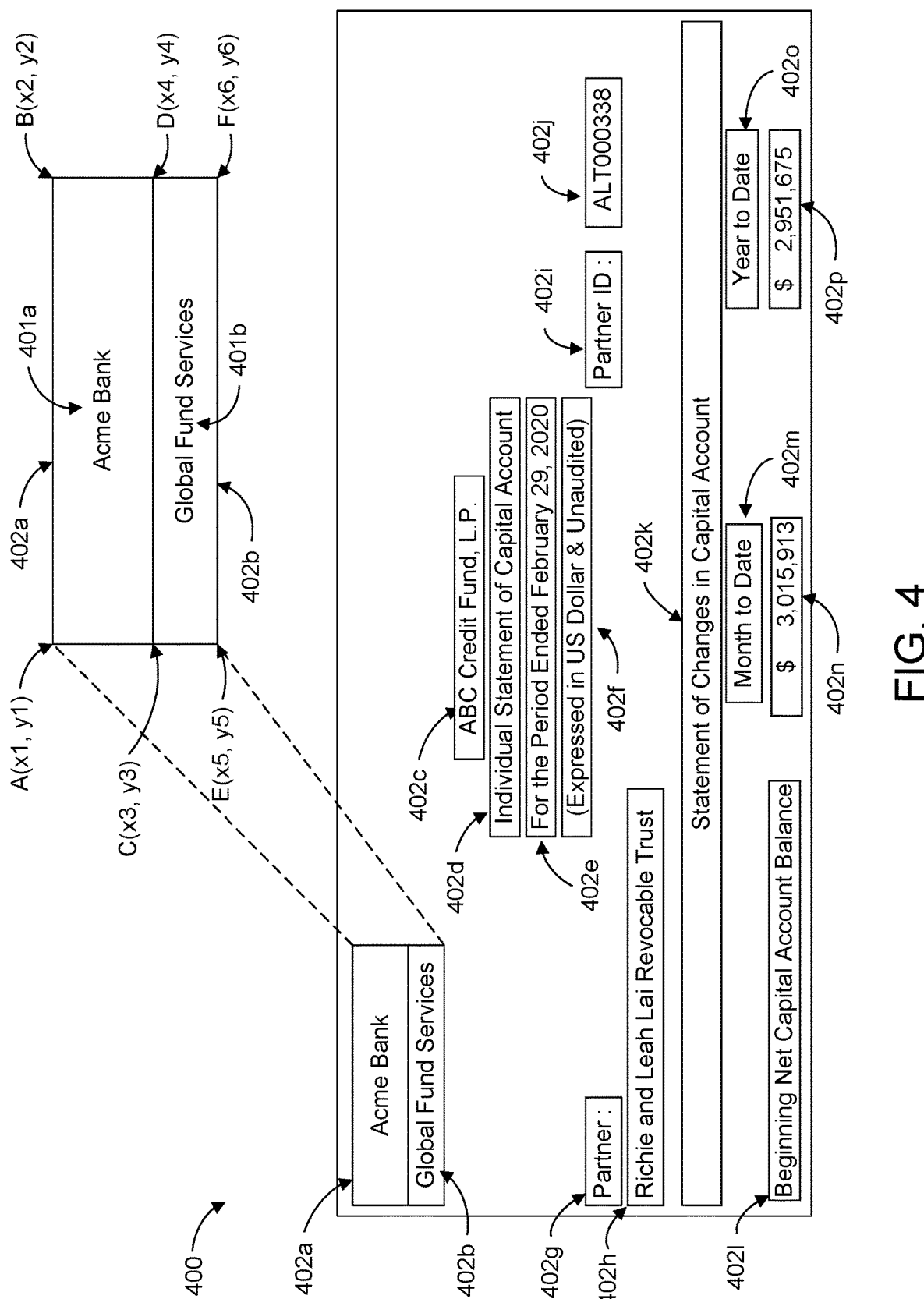
FIG. 4 is a diagram illustrating the processed document having bounding boxes corresponding to the example document of FIG. 3.
Figure 5:
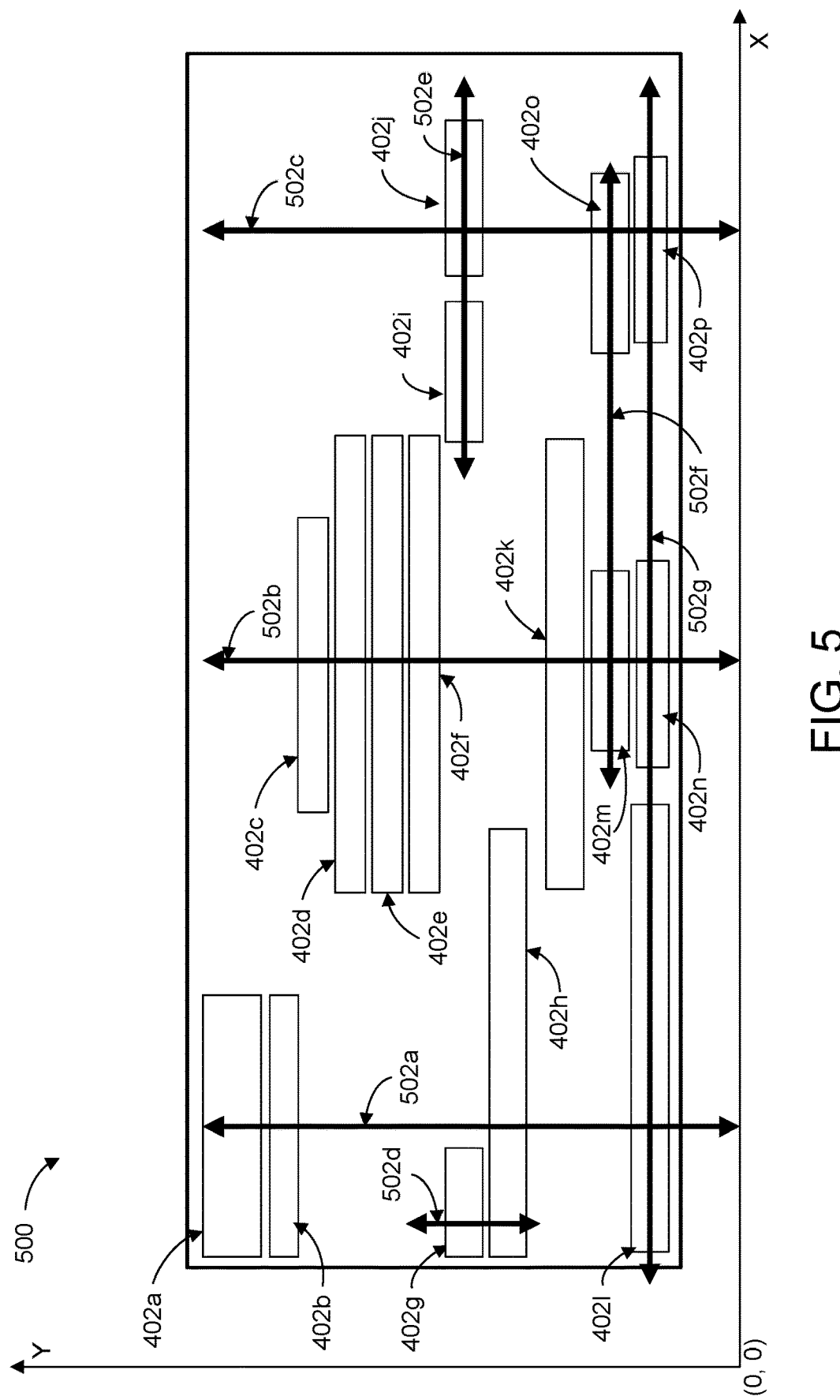
FIG. 5 is a diagram illustrating example graphical indicia overlaying the example document of FIG. 3.

FIG. 2 is a flowchart diagram illustrating a process 200 of processing a document according to an example embodiment. FIG. 3 is a diagram illustrating an example document 300. FIG. 4 is a diagram illustrating the processed document 400 having bounding boxes corresponding to the example document 300 of FIG. 3. FIG. 5 is a diagram illustrating example graphical indicia 500 overlaying the example document 300 of FIG. 3. The graphical indicia 500 are, as explained herein, implemented as graph representations (e.g., mathematical structures) generated by geometric analyzer 116 of data extraction system 110. Accordingly, the example graphical indicia 500 are shown for illustrative purposes.

As shown in FIG. 2, the process 200 includes operations 202, 204, 206, 208, 210, and 212. In some embodiments, operation 204 is optional. At operation 202, an unstructured document is received. In one implementation, the unstructured document is received by the document receiving device 112 of FIG. 1. It should be noted although the data extraction system 110 is equipped for data extraction from unstructured documents, it can also be used to extract data from various types of documents, including documents that contain information that have structure, unstructured or a combination of both structured and unstructured information.

Document 300 of FIG. 3 is an example of the unstructured document received at operation 202. As shown in FIG. 3, document 300 is an example individual statement of a capital account. As mentioned above, the techniques described in the disclosure are generally applicable to all documents regardless of subject matter and industry. In the example of FIG. 3, document 300 includes multiple titles (each referred to as a "titles") and corresponding values (each referred to as a "value"). For instance, "Partner" is a title T1, and "John and Jane Doe Revocable Trust" is a value V1 corresponding to title T1. In other words, the title T1 and the value V1 are associated, and are the target data to be extracted. Similarly, "Partner ID" is a title, title T2, and "ALT000338" is a value V2, corresponding to title T2. In some embodiments, it is possible to that title corresponds to multiple values. For example, "Beginning Net Capital Account Balance" is a title T3, whereas "3,015,913" is one corresponding value V3-1 and "2,951,675" is another corresponding value V3-2. In some examples, multiple titles correspond to one value.

Referring again to FIG. 2, in some embodiments, at operation 204, the unstructured document is preprocessed. In one implementation, the unstructured document is preprocessed by the data preprocessor 114 of FIG. 1. In some embodiments, the unstructured document, which is a physical document rather than an electronic document, may be scanned. In some embodiments, the unstructured document may go through an optical character recognition (OCR) process to convert images of typed, handwritten or printed text into machine-encoded text. In yet some embodiments, the unstructured document, which has multiple pages, may be segmented into separate pages. In some embodiments, each of those separate pages may further be segmented into various portions (each portion may be referred to as a "section"). It should be noted that other preprocessing processes may be employed as needed.

A textual block is text grouped together. Often, the text takes on the shape of a square or rectangular "block" however the embodiments described can operate on textual blocks having shapes other than a square or a rectangle. At operation 206, textual blocks in the unstructured document are recognized. In one implementation, textual blocks in the unstructured document are recognized by the geometric analyzer 116 of FIG. 1. A textual block is a collection of texts. A textual block can extend either horizontally or vertically. A textual block can extend in a manner other than horizontally or vertically (e.g., diagonally). As shown in the example of FIG. 4, "Acme Bank" is a textual block 401a, whereas "Global Fund Services" is another textual block 401b. Textual blocks, including 401a and 401b, are individually sometimes referred to as a textual block 401 and collectively as textual blocks 401. Recognition of the textual blocks 401 may be based on the process such as OCR at operation 204, in some implementations.

In some embodiments, each term (e.g., a number, an alphanumerical, a word, or a group of words, a phrase, and the like) in the document may be used to generate a corresponding textual block 401. In other embodiments, two or more terms (e.g., Social Security Number) may be combined to form a single textual block 401. In some embodiments, sometimes one term corresponds to a textual block 401, and sometimes two or more terms correspond to a textual block 401.

At operation 208, a bounding box is generated for each of the textual blocks recognized at operation 206. A bounding box is a box surrounding its corresponding textual block. In some embodiments, a bounding box is rectangular. A bounding box may have other shapes as needed. As shown in FIG. 4, a bounding box 402a is generated for the textual block 401a, whereas a bounding box 402b is generated for the textual block 401b. Bounding boxes, including 402a and 402b, are individually sometimes referred to as a bounding box 402 and collectively referred to as bounding boxes 402. Geometric information as used herein means the properties of space that are related with distance, shape, size and relative positions of a figure. In the example aspects herein, the figure corresponds to a bounding box. The geometric information of the bounding boxes 402 are generated and saved in memory.

In one implementation, geometric information of bounding boxes 402 includes coordinates of multiple vertices of each bounding box 402. The origin of the coordinate plane may be chosen to be at a point that makes the coordinates of the multiple vertices capable of being expressed as values that can be stored in a memory. As in the example of FIG. 4, bounding box 402a has four vertices, namely vertex A with coordinates (x1, y1), vertex B with coordinates (x2, y2), vertex C with coordinates (x3, y3), and vertex D with coordinates (x4, y4). Bounding box 402b has four vertices, namely vertex C with coordinates (x3, y3), vertex D with coordinates (x4, y4), vertex E with coordinates (x5, y5), and vertex F with coordinates (x6, y6). When a bounding box is rectangular, two of the four vertices are needed to determine the geometric information of the bounding box. For instance, the geometric information of the bounding box 402a can be determined if the coordinates of the vertex A (x1, y1) and the vertex D (x4, y4) are known.

In other embodiments, for example where a bounding box is rectangular and extends either horizontally or vertically, geometric information of the bounding boxes 402 may include coordinates of the centroid of the bounding box, a width in the horizontal direction, and a height in the vertical direction.

In the example of FIG. 4, multiple bounding boxes 402 are associated with document 400 (e.g., bounding boxes 402a, 402b, 402c, 402d, 402e, 402f, 402g, 402h, 402i, 402j, 402k, 402l, 402m, 402n, 402o, 402p, and the like). Each of those bounding boxes 402 surrounds a corresponding textual block and has its own size.

Referring again to FIG. 2, in some implementations, operation 206 (recognizing textual blocks) and operation 208 (generating bounding boxes) can be conducted using the machine learning kernel 126 of FIG. 1. In some examples, the bounding boxes 402 are generated using a machine learning model that learns a character set of the document (e.g., Latin script, Indic scripts, mandarin scripts, and the like). In addition, the machine learning model may be built to combine a sequence of characters into a word and declare the word as a textual block 401. When appropriate, the machine learning model may also be trained to be used to combine closely related words (e.g., an e-mail address and a phone number) into a single textual block 401 instead of two textual blocks 401. The textual blocks 401 can be determined in a number of now known or future developed ways. For example, in one implementation, the textual blocks 401 are determined by calculating the mean character distance and detecting textual blocks 401 where the mean character distance meets a threshold. The threshold can be set more precise over time after training. In other implementations, language models, n-grams and wordnet collections may be used by the machine learning model. Furthermore, in some embodiments the machine learning model utilizes the learnings from the descriptive linguistics analyzer 118 to combine words corresponding to the application that is being trained (e.g., using n-grams to determine the relationship of the words). Once the textual blocks are recognized, bounding boxes are generated accordingly using the machine learning kernel 126. Bounding boxes are determined to encompass the whole word. In some embodiments, the bounding boxes are also constructed in combination with surrounding words so that center aligned, left aligned and right alignment is recognized. In some embodiments more than one bounding box can overlap. For example, one word can be part of two bounding boxes. In some embodiments, the bounding boxes are rectangular and the machine learning kernel is trained on those rectangular bounding boxes. In other embodiments, the machine learning kernel can be trained using bounding boxes of other shapes (e.g., hexagonal).

A search path is a plot, by a computer application, of route between two points. In some embodiments, a single search path is determined. In some embodiments, multiple potential search paths are determined. A search path can be a vertical search path or a horizontal search path. In some embodiments, a search path is a diagonal search path or a nonlinear search path (e.g., curved).

If more than one search path is determined, the search path that is selected to be used need not be the shortest search path. Indeed, it may be more accurate to select a search path longer than other search paths that have been determined.

Referring again to FIG. 2, in this example implementation, at operation 210 multiple search paths are determined. In some implementations, the multiple search paths are determined by the geometric analyzer 116. Each of the multiple search paths has two endpoints and the coordinates of the endpoints are saved in memory. Each of the multiple search paths cover at least two bounding boxes 402. As described above, in some implementations, the search paths include both horizontal search paths and vertical search paths, but aspects of the embodiments herein are not so limited. It may be the case that the search paths are diagonal or non-linear. In some examples, a search path may connect two bounding boxes 402. In other examples, a search path may connect two bounding boxes 402 and at least one intermediate bounding box 402 therebetween.

In some implementations, operation 210 can be conducted using the machine learning kernel 126 of FIG. 1. FIG. 5 illustrates various search paths 502a, 502b, 502c, 502d, 502e, 502f, 502g. Herein, a search path is sometimes individually referred to as a search path 502 and multiple search paths are collectively referred to as search paths 502, correspondingly. In some examples, the machine learning model can establish the search paths 502 based on the detected orientation-related information of the bounding boxes 402. For example, all bounding boxes 402 that are aligned to the right of a document may be connected by a vertical search path 502, while all bounding boxes 402 that are aligned to the bottom of the document may be connected by a horizontal search path 502. In some embodiments, the horizontal and vertical search paths are determined in relation to a bounding box. For example, as shown in FIG. 5, search path 502d is obtained as a search path in relation to bounding box 402g, and involves 402h, whereas search path 502a is determined in relation to bounding box 402h, and involves 402a, 402b, 402l.

As shown in the example of FIG. 5, there are four vertical search paths 502a, 502b, 502c, and 502d and three horizontal search paths 502e, 502f, and 502g determined at operation 210. Vertical search paths 502a, 502b, 502c, and 502d and horizontal search paths 502e, 502f, and 502g are collectively referred to as the search paths 502. As described above, some search paths 502 (e.g., vertical search path 502d) may connect only two bounding boxes 402, while other search paths 502 (e.g., horizontal search paths 502g) may connect more than two bounding boxes. Generally, all bounding boxes 402 are covered by at least one search path 502. In some embodiments, a bounding box 402 is connected to other bounding boxes through one or more search paths 502.

At operation 212, a graph representation is generated. In some implementations, the graph representation includes information on the bounding boxes 402 and information on the search paths 502. In some examples, the information on the bounding boxes 402 may include coordinates of vertices of those bounding boxes 402, while the information on the search paths 502 may include coordinates of endpoints of those search paths 502.

Figure 6:
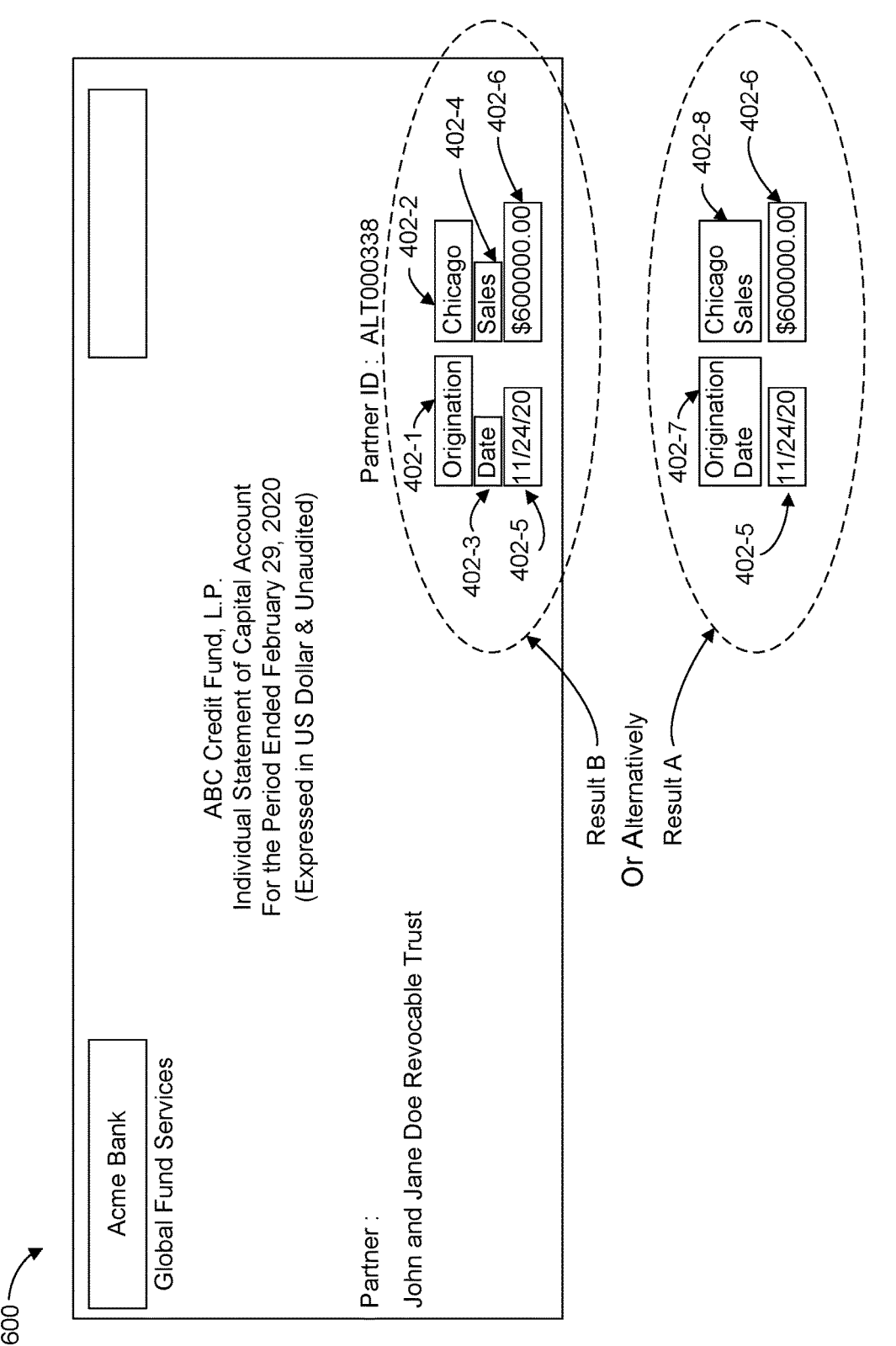
FIG. 6 is a diagram illustrating an example document where generated bounding boxes may be incorrect.

Sometimes the initial generated graph representation is not ideal. FIG. 6 illustrates an example document 600 illustrating generated bounding boxes, where the generated bounding boxes may be incorrect. As shown in the example of FIG. 6, the bottom right corner includes some characters that can be interpreted differently, resulting in either the result A or the result B.

As shown in this example, in result A, "Origination Date" is recognized as a textual block 402-7 as a title, and "11/24/20" is recognized as a textual block 402-5 as its corresponding value; "Chicago Sales" is recognized as a textual block 402-8, and "$600000.00" is recognized as a textual block 402-6 as its corresponding value. Result A seems reasonable if the context of the document 600 is, for example, a travel agency or the like.

In result B, "Origination" is recognized as a textual block 402-1 as a title, and "Chicago" is recognized as a textual block 402-2 as its corresponding value; "Date" is recognized as a textual block 402-3, and "11/24/20" is recognized as a textual block 402-5 as its corresponding value; "Sales" is recognized as a textual block 402-4, and "$600000.00" is recognized as a textual block 402-6 as its corresponding value. Result B seems reasonable if the context of the document 600 is a bank statement or the like.

Therefore, geometric analyzer 116 of FIG. 1 alone, in some circumstances, may not be capable of determining which of result A and result B is better with a high confidence level. In situations like this, descriptive linguistics analyzer 118 may be used in cooperation with geometric analyzer 116. This enables context of a document to be used to determine the orientation of a search path 502. Advantageously, this improves the speed of the document scanning and data extraction, which in turn further can save significant computing resources, improve accuracy, and enables a more secure process (because less, if any, human corrective action is required).

Figure 7:
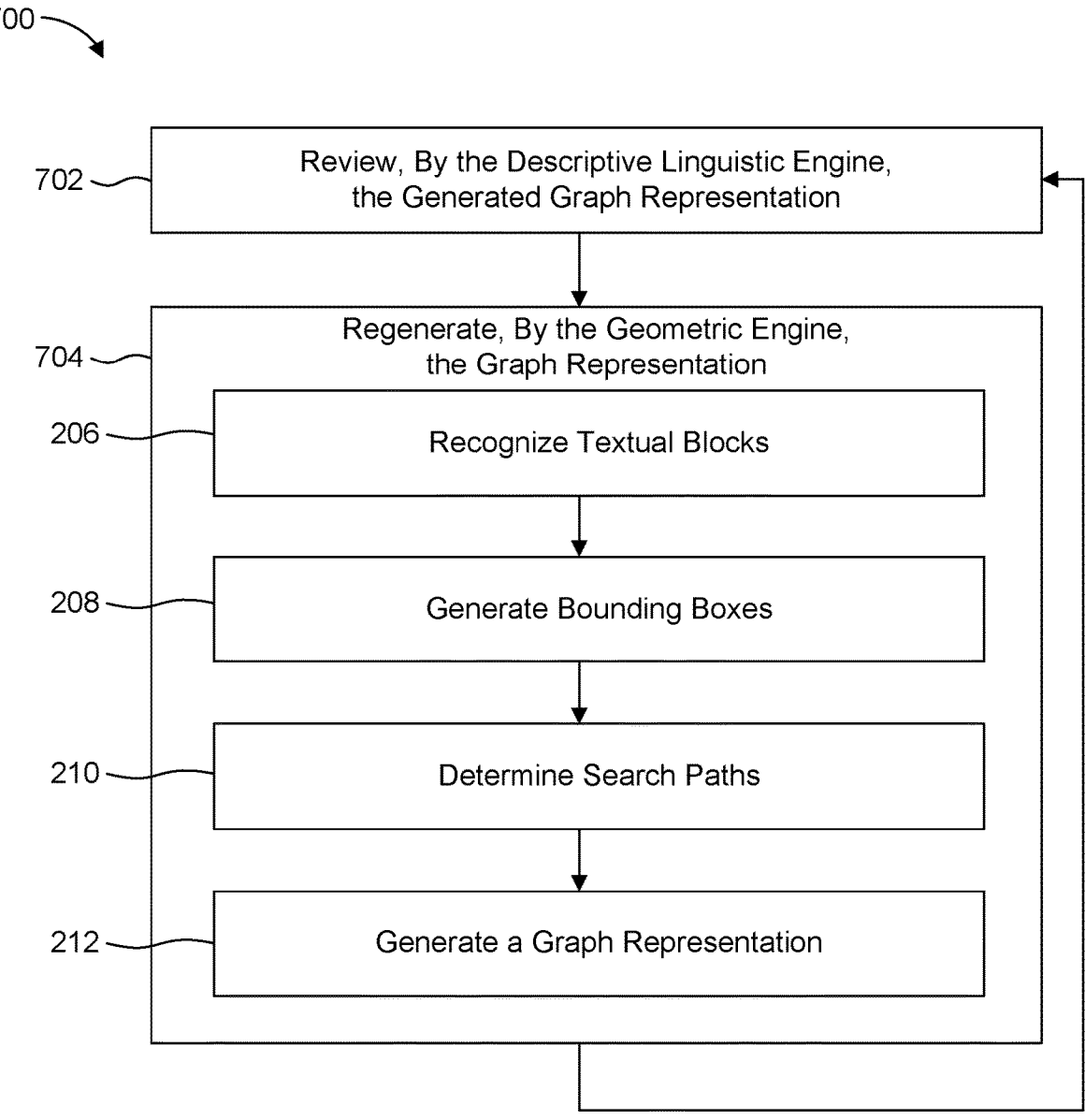
FIG. 7 is a flowchart diagram illustrating a process of regenerating the graph representation according to an example embodiment.

FIG. 7 is a flowchart diagram illustrating an example process 700 of regenerating the graph representation according to an example embodiment. The process 700 includes operations 702 and 704, and operation 704 further includes operations 206, 208, 210, and 212 of FIG. 2.

At operation 702, the generated graph representation is reviewed by the descriptive linguistics analyzer 118 of FIG. 1. In some implementations, the geometric analyzer 116 can generate confidence scores for different textual blocks 401 and bounding boxes 402. In the example of FIG. 6, the confidence scores for the bounding boxes 402-7 and 402-8 in result A may have a relatively low confidence score (e.g., 61 out of 100). As a result, the descriptive linguistics analyzer 118 may review the generated graph representation and determine whether there is any error. In one implementation, the review could be based on subject matters or contexts of the document 600. In the example of FIG. 6, since the subject matter is a bank statement based on the title "ABC Credit Fund, L. P. Individual Statement of Capital Account," the descriptive linguistics analyzer 118, relying on the machine learning kernel 126 of FIG. 1 for example, can determine that Result A should be an error because it makes more sense when the context is a travel agency. As a result, the process 700 proceeds to operation 704.

A confidence level is the probability that the associations generated by the geometric extractor are related. The confidence level is generated by the machine learning kernel 126 based on the training data that the machine learning kernel 126 has either been trained or finetuned on. A linguistics analyzer can use machine learning kernels (e.g., recursive neural networks, transformers, and the like) to provide confidence scores on how two textual entities are related when they are part of a paragraph or a sentence. In some embodiments, the machine learning kernel combines both the linguistic analysis output leanings and geometric extractor output leanings to provide an overall confidence score on the associations.

At operation 704, the geometric analyzer 116 regenerates the graph representation. In other words, the geometric analyzer 116 may repeat operations 206, 208, 210, and 212 as shown in FIG. 7. After operation 704, a new graph representation 212 is generated. Then the process 700 circles back to operation 702, where the regenerated graph representation is revised by the descriptive linguistics analyzer 118 again. This process can continue for multiple iterations until the confidence scores are good enough (e.g., above a threshold confidence score). For instance, when the regenerated graph representation reflects the result B of FIG. 6, the process 700 ends. As such, the descriptive linguistics analyzer 118 serves as a correction mechanism for the geometric analyzer 116, utilizing the machine learning kernel 126 of FIG. 1 or any data stored in the database 120 of FIG. 1.

Figure 8:
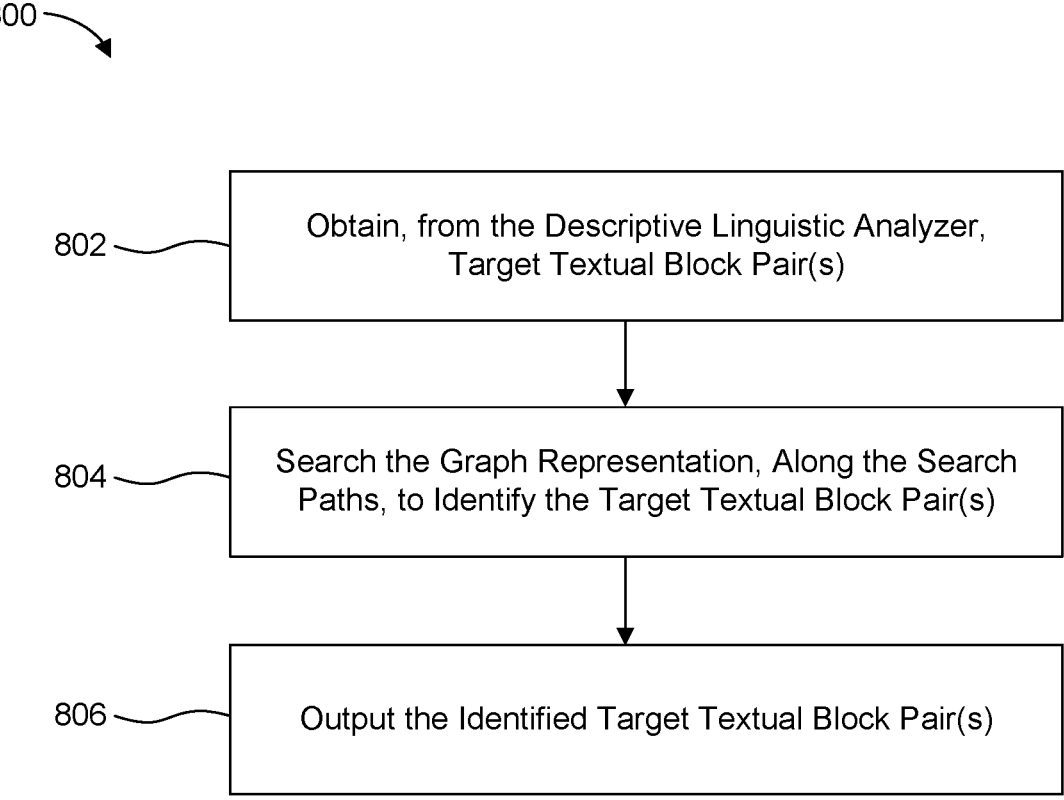
FIG. 8 is a flowchart diagram illustrating a process of processing a document according to an example embodiment.

FIG. 8 is a flowchart diagram illustrating a process 800 of processing a document according to an example embodiment. Process 800 includes operations 802, 804, and 806. The process 800 can be considered as a process that is downstream from process 200 described above in connection with FIG. 2. In other words, operation 802 can follow operation 212 of FIG. 2 or operation 704 of FIG. 7.

At operation 802, one or more target textual block pairs are obtained from the descriptive linguistics analyzer 118. In turn, at operation 804, the graph representation is searched along the search paths to identify the target textual block pairs. The identified target textual block pair(s) are then output, as shown at operation 806.

In some embodiments, searching the graph representation along the search paths to identify the target textual block pairs includes locating a first textual block, searching the graph representation, starting from the first textual block and along one of the plurality of horizontal search paths, and searching the graph representation, starting from the first textual block and along one of the plurality of vertical search paths. In an example implementation, the graph representation can be searched until a predetermined criterion is met. An example predetermined criterion can be, for example based on one of the target textual block pairs is identified. Thus searching the graph representation can be stopped after one of the target textual block pairs is identified.

In yet another example implementation, the predetermined criterion can be based on whether a first number of textual blocks have been searched. Thus, in this example embodiment, the searching of the graph representation is stopped after a first number of textual blocks have been searched.

In some embodiments, a semantic module can be used to define what needs to be searched or associated in the document. In some example use cases, the associations are one to one such that one textual block (e.g., SSN) is associated with only one other textual block (e.g., 999-99-9999). In some use cases one textual block (e.g., "Grocery Items") is associated with multiple textual blocks (e.g., apples, potatoes, etc.). In other embodiments multiple textual blocks ("Quarterly Sales", "June 2020") are associated with a single text block (e.g., $120MM). These association possibilities are provided to semantic module at design stage of the extraction.

In yet another embodiment, for one to many associations, all first, second and other ordinal associations are grouped into a record.

A textual signature is a spatial pyramid of characters that represents the same semantic meaning. In some embodiments, one or more textual signatures of the different values (semantics) for an entity that can be manifested in a textual block are input to the semantic module. For example, a date could be represented in various textual signatures (mm/dd/yy or DAY of MONTH, YYYY). In addition, the textual signature may include different types of values. For example, an entity in a textual block can be composed of different parts where each part represents a distinct piece of information (e.g., social security numbers are of the form 999-99-9999, where the first set of three digits is the Area Number, the second set of two digits is called the Group Number and the final set of four digits is the Serial Number). In one embodiment, the textual signatures could be provided using the regular expression string syntax. In other embodiment, the textual signatures can be provided by user-defined predicate functions or small software modules. In a third embodiment, the textual signatures could simply be provided as an enumerated list of all possible values.

With the combination of the geometrically aligned textual blocks (i.e., the graph), their associated search paths (referred to as "walks"), the textual signatures of the entities, aspects of the embodiments being matching the textual signatures of blocks provided by the semantics module along the search paths. In some examples, the search path is to look to the right search path of an entity for a match and then to the bottom search path of the entity if a match is not found. The search can continue, for example, for multiple matches even if a match has been established. Alternatively, the search direction can be altered from the nominal (right and down) to user defined directions and the order of those direction. For example, the module could be instructed to look in the top search direction first and then to the left direction. This is useful for reverse lookups where first any textual entity that has the signature (for example, a date) is determined and then the corresponding matching description for the date (Maturity Date) is searched.

In yet another embodiment, a search can continue for a finite set of comparisons irrespective of if there is a match. For example, look only two blocks to the left and then stop searching.

In another embodiment, the search continues until a user defined stopping criterion is met. The stopping criterion normally is to stop when there are no more blocks along the search direction. However, another stopping criterion could be at first non-match of the signature. Another stopping criteria could be when finite number of matches has been reached.

Once the above search and match process is completed, the matched entities can be output for further processing.

As evident by the above detailed procedure, example embodiments can be used to extract and associate information from any form-like document. The association is made by the geometry and proximity of the entities. The extraction is not specific to any template. The extraction is resilient to changes in the template (for example, the module can extract the information whether the SSN: 999-99-9999 in the top right of the document or in the middle or at the bottom) or changes in the semantics of the template (if Social Security Number is spelled out as compared to abbreviated "SSN").

The systems and methods described herein can be applied to any form-like documents. By increasing the semantic understanding of the various common terms in a specific domain it can be extended and quickly reused to extract form data from any domain. The geometric module-construction of the textual blocks, connections of the blocks and construction of the search paths along with the signatures for searching and association of the entities enable more accurate geometric extraction.

Depending on the textual sequence of the block (e.g., email vs. stock picks), the machine learning algorithm could continue the search path through multiple blocks or end after a finite number of blocks. The machine learning model is trained on a correspondence score of the content of each of the plurality of the textual blocks. The correspondence score could be trained using match to a regular expression pair, trained using the similarity of a language model (e.g., word2vec, contextual language model generated embeddings. For example, from ELMo, BERT, RoBERTa and others) or trained using a sequence-to-sequence neural networks that may use techniques such as RNNs or Transformers. Descriptive linguistic models can utilize the language representation of words and characters in spoken (prose-like) language. A geometric analyzer can utilize geometric relationships between objects whether the objects are textual, pictorial or a combination. In some embodiments, the machine learning kernel 126 utilizes the training data to learn the correspondence between textual blocks utilizing combinations of both the geometric analyzer representations and the descriptive linguistic representations. Furthermore, the kernel also learns the appropriate geometric search paths along which the correspondence scores are most likely to be maximum.

Figure 9:
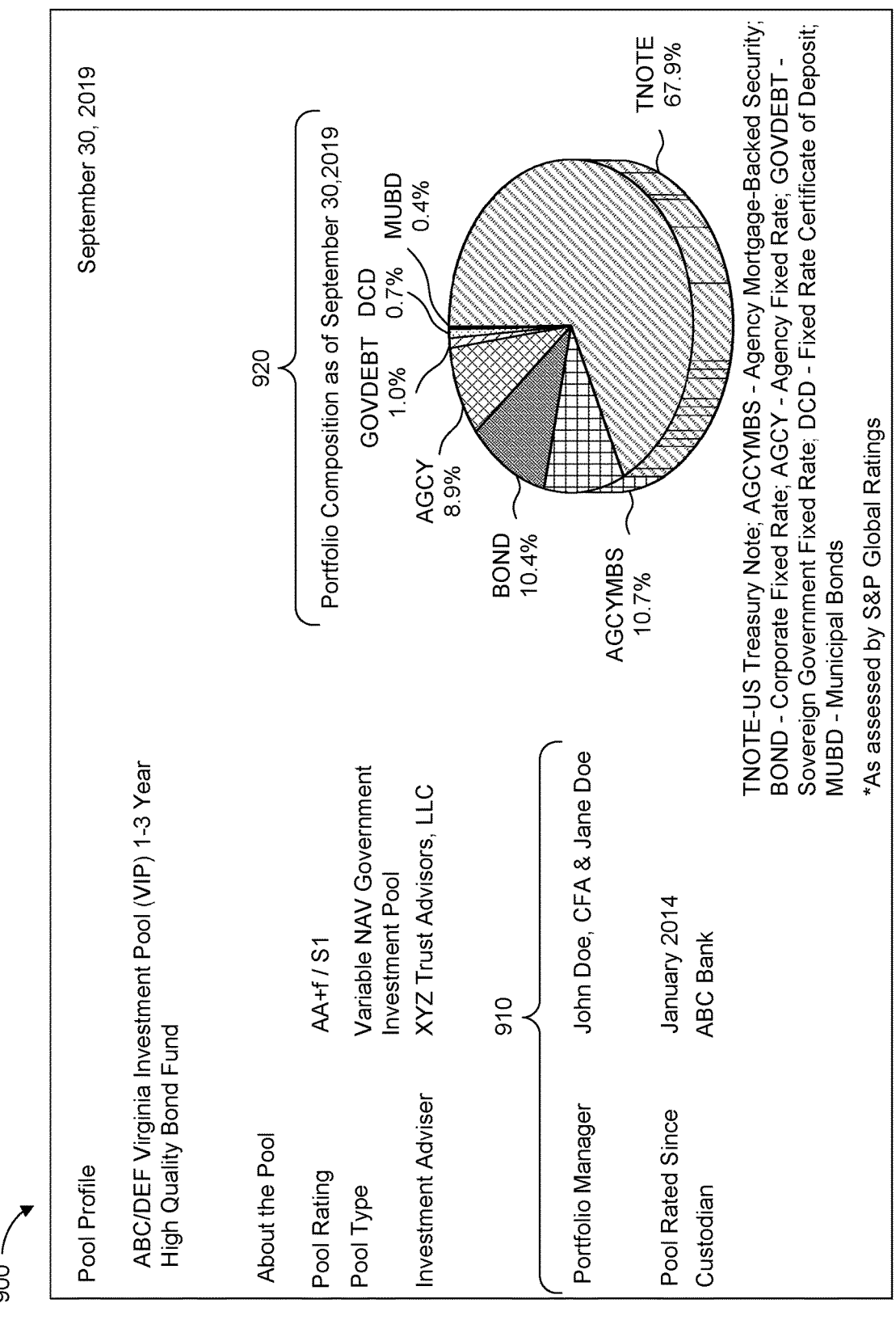
FIG. 9 is a diagram illustrating an example document.

FIG. 9 is a diagram illustrating an example document 900. FIG. 10 is a data extraction result 1000 corresponding to the document 900 of FIG. 9. The example document 900 can be, for example, a PDF formatted document. The example document 900 can also be, for example, an Excel formatted document. What the document relates to is not important. In this example, document 900 relates to a bond fund and the document indicates various attributes related to a particular profile referred to as a Pool Profile. In this particular example the document indicates, among other information, who are the portfolio managers 910. Notably, one of the portfolio managers is associated with a certification while the other is not. The document further indicates the portfolio composition along with associated details 920. In this example use case the document illustrates information both in textual format and graphically (e.g., the pie chart). It should be understood that other formats can be used.

In an exemplary implementation, the data extraction result 1000 is a record of associations of the elements extracted from document 900. the data extraction result can include an identifier identifying the data extraction result, Document identifier (ID) 1002, and a time of data extraction, Data Extraction Time 1004. In an example embodiment, the data extraction result 1000 includes a confidence score 1008. As explained above, a confidence score 1008 is the probability that the associations generated by the geometric extractor are related. In some embodiments, a confidence score for each extracted entity:value pair (also referred to as named entity pair) is determined and all the confidence scores are aggregated for the unstructured document to generate the confidence score 1008 (also referred to as an aggregated confidence score 1008). In some embodiments each confidence score can be presented for individual correspondences (e.g., individual extracted entity:value pairs).

In some embodiments, the data extraction result 1000 generated by the data extraction system 110 is an electronic file. In an example implementation, the electronic file includes a selector which, when selected via an interface, operates to cause an operation to be performed. In the example shown in FIG. 10, the selector 1010 is a review selector and the operation causes the original document 900 to be open via an interface (e.g., I/O interface 198) for review the information thereon. This allows for visual verification against the data extraction result 1000. In some embodiments, data extraction result 1000 is enabled to receive changes to any element, such as any title 1005 (e.g., State 1005-1, Investment Advisor 1005-2, Portfolio Manager 1005-3, Portfolio Manager Name 1005-4, Portfolio Manager Title/Certification/Degree 1005-5, Custodian 1005-6, Portfolio Composition As of Date 1005-7, Portfolio Composition 1005-8), first value 1006 (e.g., corresponding value #1: 1006-1, 1006-2, 1006-3, 1006-4, 1006-5, 1006-6, 1006-7, and 1006-8), second value 1007 (e.g., corresponding value #2: 1007-1, 1007-2, 1007-3, 1007-4, 1007-5, 1007-6, 1007-7, and 1007-8). Any corrections made can entered into data extraction results 1000 can be read by a machine learning processor and used to train a model. The training data can be stored in database 120. Such supervised training schema enabled geometric extraction system 110 to improve over time. While training data is used to create a machine learning kernel and use it, such visual verification systems provide auxiliary training data for improvement of the machine learning kernel performance by including the changed extraction result in the training set and retraining the machine learning kernel to learn from the corrections made. This retraining could be initiated either on a periodic basis or after a certain threshold number of corrections.

In some embodiments, information fields are title:value pairs. In the example of FIG. 10, a title 1005 can have a first value 1006 and a second value 1007. In addition, data extraction system 110 may determine that a title 1005 has one or more overlapping values 1006-3, 1006-4, 1006-5. In the example depicted in FIG. 10, for example, it may be the case that at least one of the elements of information on document 900 consists of a single title:value pair (e.g., title:Portfolio Manager corresponds to value: "John Doe, CFA & Jane Doe"). Alternatively, data extraction system 110 may detect that a particular element of information corresponds to more than one title as in this example. In this example, it may be the case that the title Portfolio Manager 910 can be associated with more than one title, such as Portfolio Manager 1005-3, Portfolio Manager Name 1005-4 and Portfolio Manager Certification 1005-5. Thus, in this case, a first title may be associated with the entire value associated with it based on geometry alone or based on one or more combinations of the information on the document.

The embodiments described herein further enable automatic extraction of information from various documents and grouping of that extracted data. The system also is able to obtain additional information necessary to complete a record from a system of record.

Figure 11:
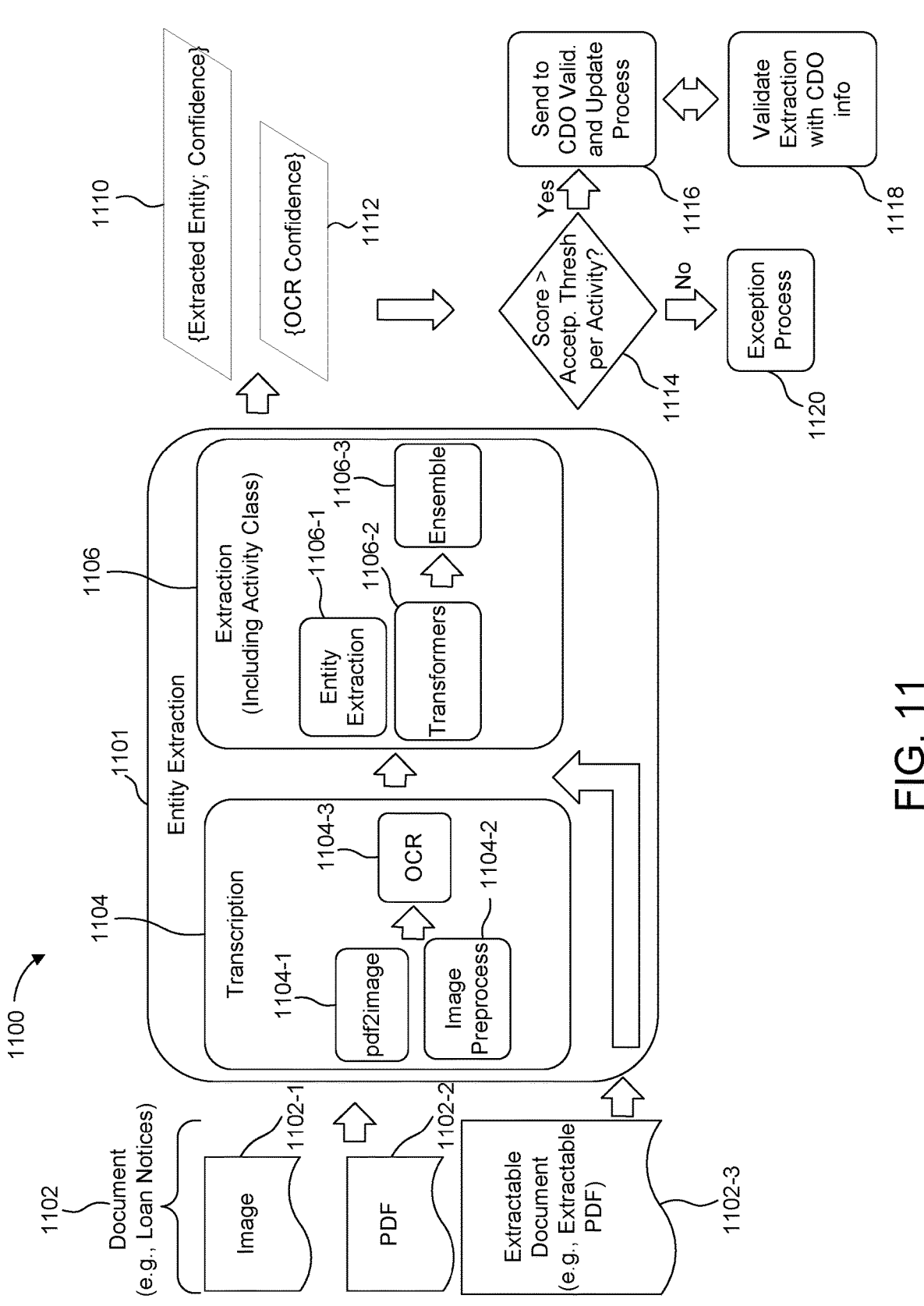
FIG. 11 illustrates an architecture and system flow for performing a single document extraction process according to an example embodiment.

FIG. 11 illustrates an architecture and system flow for performing a single document entity extraction operation 1100 according to an example embodiment. In this example, the single document is a loan notice document (referred to for convenience simply as "loan notice"). As explained above, in the domain of lending, a loan notice document is a formal written communication sent by a lender to a borrower regarding their loan. Typically, it contains information about the loan, including the amount borrowed, the interest rate, the repayment schedule, and any fees associated with the loan. However, the information on a loan notice may vary, depending on the specific lender and the type of loan being offered. A loan notice document may further include a facility name, an activity type, an effective date, and a deal name, among other details regarding a particular lending transaction. Various documents related to loan notices may be used by the lender to process the loan. The documents, however, may contain data that specifies particular information that may change, either unexpectedly or at a known time. In some use cases, a document may specify fallback data to replace the expired data. Yet in other use cases, the document may not specify fallback data that replaces the expired data.

While the example implementations described herein refer to loan notices or documents related to lending, it should be understood that the embodiments are not so limited. The embodiments described herein can be used for extracting and validating entities extracted from other types of documents and which may contain data that expires, changes over time, contains errors, contains missing information, or the like. The embodiments described herein can also be used for grouping several related documents in domains other than lending.

In an example use case, a loan notice is generated, where the loan notice contains entity information. In addition to identifying information (e.g., borrower's name), a loan notice may include details about the loan itself, such as the loan amount, a date, interest rate, repayment terms, facility name, and any fees or penalties associated with the loan. Typically, some of this entity information changes over a period of time for various reasons (e.g., the interest rate of a variable loan) and some of the entity information remains consistent (e.g., borrower's name). It may be the case that during an extracting operation, a fixed entity extracted from one of several related documents is extracted incorrectly (e.g., "John Smith" is extracted as "John Mith"). That is, the extraction operation from all but one loan notice document has extracted the entity correctly. One virtue of the embodiments described herein is that an incorrect extraction will detect the error.

Referring to FIG. 11, a document 1102 (e.g., loan notice) to be processed is received in any one or a combination of several formats. In one use case, the document is in the form of an image 1102-1 formatted in an image format such as Joint Photographic Experts Group (JPEG) or Tag Image File Format (TIFF). In another use case, the document 1102 is in the Portable Document Format (PDF) file format 1102-2. In yet another use case, the document 1102 is in an extractable document format 1102-3, such as the extractable PDF format. An extractable document (e.g., an extractable PDF) as used herein is a document from which elements such as text, tables, and images can be extracted. It should be understood that other similar file formats that provide a way to present and exchange documents can be used and still be within the scope of the embodiments herein.

Single document entity extraction operation 1100 involves a transcription operation 1104 and an extraction operation 1106 which are referred to collectively as entity extraction operation 1101.

Transcription operation 1104 performs transcribing the document 1102. In an example implementation, the transcription operation 1104 includes performing a PDF-to-image processing operation 1104-1 to convert a PDF document 1102-2 to an image. PDF documents may contain text, images, and other graphical elements, which can make it challenging for OCR software to accurately recognize and extract text. By converting the PDF to an image, the OCR operation 1104-3 has a clearer, more uniform representation of the text to work with, which can lead to better accuracy. PDF documents can have complex layouts, such as multi-column pages, tables, or footnotes, which can also be challenging for OCR software to accurately recognize and extract. Converting the PDF to an image can simplify the layout and make it easier for the OCR software to accurately recognize the text. In an example embodiment, the geometric extraction process described above operates on the image and can be applied to this embodiment.

Transcription operation 1104 may further include an image preprocessing operation 1104-2 that performs image preprocessing operations on the document 1102. The process of transcribing involves converting text in an image into editable digital text that can be searched, analyzed, or modified. The image preprocessing operation 1104-2 can be used to improve the quality of the image of the document 1102, reduce noise, and enhance the text so that it can be accurately recognized and transcribed. In some embodiments, image preprocessing operation 1104-2 performs image enhancement to adjusting the brightness, contrast, and sharpness of the image to improve its quality, noise to remove any unwanted artifacts or background noise from the image to improve its clarity and readability, image segmentation to divide the image into smaller sections or regions to help the transcribing software identify individual characters more accurately and text detection to identifying areas of the image that contain text and separating them from the rest of the image.

Transcription operation 1104, in some embodiments, further includes an optical character recognition (OCR) operation 1104-3 that performs optical character recognition to recognize the characters in the image 1102-1 of the document or PDF document 1102-2, particularly to convert the characters into digital text.

The transcribed documents are, in turn, are applied to an extraction operation 1106 that performs entity extraction. As shown in FIG. 11, the extraction operation 1106 can include an entity extraction operation 1106-1 such as the geometric extraction mechanisms described herein.

In machine learning, a transformer refers to a type of neural network architecture. Transformers are designed to process sequential data, such as natural language text, by using a self-attention mechanism. The self-attention mechanism allows transformers to selectively focus on different parts of the input sequence to compute a representation of each element in the sequence. This means that transformers can capture long-range dependencies and relationships between different parts of the input sequence, which are used in a particular manner for the natural language processing tasks described herein. In some embodiments, transformers 1106-2 perform processing on the data obtained from the transcribing operation 1104 or directly from information retrieved from an extractable (e.g., extractable PDF) document 1102-3.

In addition, extraction operation 1106 includes an ensemble framework 1106-3. In machine learning, an ensemble is a technique that combines multiple models to improve the overall performance of a system. The basic idea behind typical ensemble methods is to use a group of different models and combine their predictions to obtain a more accurate and robust result than any of the individual models could achieve alone. In an example implementation, multiple models are built on different subsets of the training data. In turn, the predictions of the models are combined. This can help to reduce the variance in the model and improve its generalization performance.

In some embodiments, the output of the multi-document grouping and validation process 1306 includes an {extracted entity:confidence score} pair 1310 and an OCR confidence score 1312.

In some multi-model architectures, the models are weak. It may be the case that the models have been iteratively built, where each model focuses on the samples that were misclassified by the previous model. An ensemble framework according to the embodiments herein can help to improve the entity extraction accuracy.

In some embodiments, the predictions of multiple models are combined by training a new model to learn how to best combine one or more of the individual models' outputs. This can be particularly effective when the individual models have different strengths and weaknesses.

In some embodiments, the output of the single document entity extraction operation 1100 includes an {extracted entity:confidence score} pair 1110 and an OCR confidence score 1112.

In an example implementation, the confidence score in the {extracted entity:confidence score} pair, also referred to simply as extracted entity confidence value 1110 or extracted entity confidence score 1110, is a measure of how confident the single document entity extraction operation 1100 is in identifying a particular entity or information from text. Extracted entity confidence scores can be expressed as a percentage or a decimal value between 0 and 1, with higher values indicating a higher level of confidence in the entity extraction. For example, if an NLP system identifies the name of a person in a text and assigns a confidence value of 90%, it means that the system is 90% certain that the identified name is accurate.

In an example implementation, OCR confidence score 1112 represents a level of certainty that an OCR system has in recognizing a particular character or word from an image or scanned document. In an example implementation, OCR confidence score 1112 is expressed as a percentage or a decimal value between 0 and 1, with higher values indicating a higher level of confidence in the OCR result. For example, an OCR operation 1104-3 may assign a confidence value of 95% to a word it has recognized, indicating that it is 95% certain that the recognized text is accurate.

In some embodiments, one or both of the confidence scores are compared against a respective threshold. In an example implementation, the extracted entity confidence score 1110 and the OCR confidence score 1112 are combined to form a combined confidence score. An acceptance threshold operation 1114, in turn, performs comparing the confidence scores to an acceptance threshold value. The comparison can be against the combined confidence scores, the extracted entity confidence score 1110 individually or the OCR confidence score 1112 individually).

If a determination is made by the acceptance threshold operation 1114 that the combined confidence score meets the acceptance threshold value, an extracted entity transmission operation 1116 performs transmitting the extracted entity to a database (e.g., in the case of loan documents, to a collateralized debt obligation (CDO) database) for further processing and updating the underlying process associated with the transaction corresponding to the document. In addition, a validation operation 1118 performs validating the extracted entity with the CDO information.

A CDO database is a type of database used by financial institutions to manage and analyze data related to collateralized debt obligations. CDOs are financial instruments that are created by pooling together a diverse set of assets, such as mortgages, corporate bonds, and other debt instruments, and then repackaging them into tranches of varying risk levels that are sold to investors. CDOs can be difficult to manage and analyze because they involve a large number of underlying assets with complex relationships and dependencies. A CDO database is designed to help financial institutions manage the data related to CDOs, including the underlying assets, their performance, and the associated risk profiles. The database may include information such as the credit ratings of the underlying assets, their cash flows, and the performance of the CDO as a whole. The database may also be used to track changes in the composition of the CDO and to analyze the impact of different scenarios on the CDO's performance.

In an example implementation, to validate an extracted entity with a CDO database an entity identification operation identifies the entity to validate. This could be any object or concept that has been extracted from a text document or dataset.

The CDO database can be a repository of information about the securities and collateral backing a CDO. Particularly, it can contain information about the underlying assets, their performance, and other relevant data. In some embodiments, an entity existence check is performed to determine if the extracted entity exists in the CDO database. If not, an exception process (e.g., error remediation process) can be spawned to determine why it does not exist or to determine if there is a need to update the CDO database to include the new entity.

If the extracted entity exists in the CDO database, an entity attribution verification operation can be performed to check the attributes of the extracted entity against the attributes defined in the CDO database. This step can be performed to ensure that the attributes are accurate and consistent with the definitions in the CDO database.

In some embodiments, an entity relationship validation operation is performed. If the extracted entity has relationships with other entities, this operation checks whether the relationships are defined in the CDO database and that they are accurate.

Additional operations may be performed. For example, an entity performance check operation can be performed. For example, if the extracted entity is a security or collateral, the entity performance check operation performs verifying any performance metrics of the extracted entity, such as its rating, default probability, and other relevant factors, are consistent with the data in the CDO database.

A data source cross-check operation can also be performed to further validate the extracted entity. In an example implementation, the extracted entities are cross-checked against data from other sources, such as ratings agencies or news reports. This can be used, for example, to verify the accuracy and reliability of the data.

Validating an extracted entity with a CDO database involves verifying that the entity and its attributes, relationships, and performance metrics are accurate and consistent with the CDO database. This is useful in ensuring that the data is reliable and can be used for analysis or other purposes.

In some embodiments, extracted entities can also be cross-checked against each other for correctness and completeness.

Referring still to FIG. 11, if a determination is made by the acceptance threshold operation 1114 that the combined confidence score does not meet the acceptance threshold value, an exception process 1120 spawns an exception process, such as an error remediation process that remediates the error (e.g., by asking an assigned user for manual input regarding how to address the error).

The single document entity extraction operation generates an extracted entity confidence score 1110 and an OCR confidence score 1112 that can also be used to integrate the extracted entities with existing CDO databases. On integration with the CDO databases, aspects of the embodiments improve and further enable automated exception processing.

In some embodiments, partial extractions can be used to speed up any necessary manual update, for example, for documents that fail to meet a pass-through requirement.

FIG. 12 illustrates a database record containing records extracted from multiple documents according to an example implementation. The entity extraction methods and systems as well as the grouping and validation methods and processes described herein are applied to database records such as the one depicted in FIG. 12 and used to group, validate, and perform exception processing.

In this example use case, each document is assigned a document identifier (Document ID). Each document also contains information such as a deal name, a facility name, a notice type, a date of receipt, and an effective date as depicted in the example database record of FIG. 12. It should be understood that for simplicity additional information in such documents and database records are not shown.

As also shown in FIG. 12, several documents are matched according to particular entities (e.g., deal name, facility name, effective date). Other entities can be used to match the documents as well. For example, entities such as the sender of the documents and a CUSIP (Committee on Uniform Securities Identification Procedures) number associated with the documents (both not shown) can be matched. Also as shown in FIG. 12, soft matching (or similarity matching) is also performed to match entities that are similar but not matched with a confidence level that meets a threshold. As shown in this example use case, soft matching of the activity type and dates of receipt is possible. Particularly, in this example use case, and for illustration purposes, documents in rows 1, 2, 6, and 7 can be matched with some level of confidence. In some cases, the level of confidence can be significantly lower.

Figure 13:
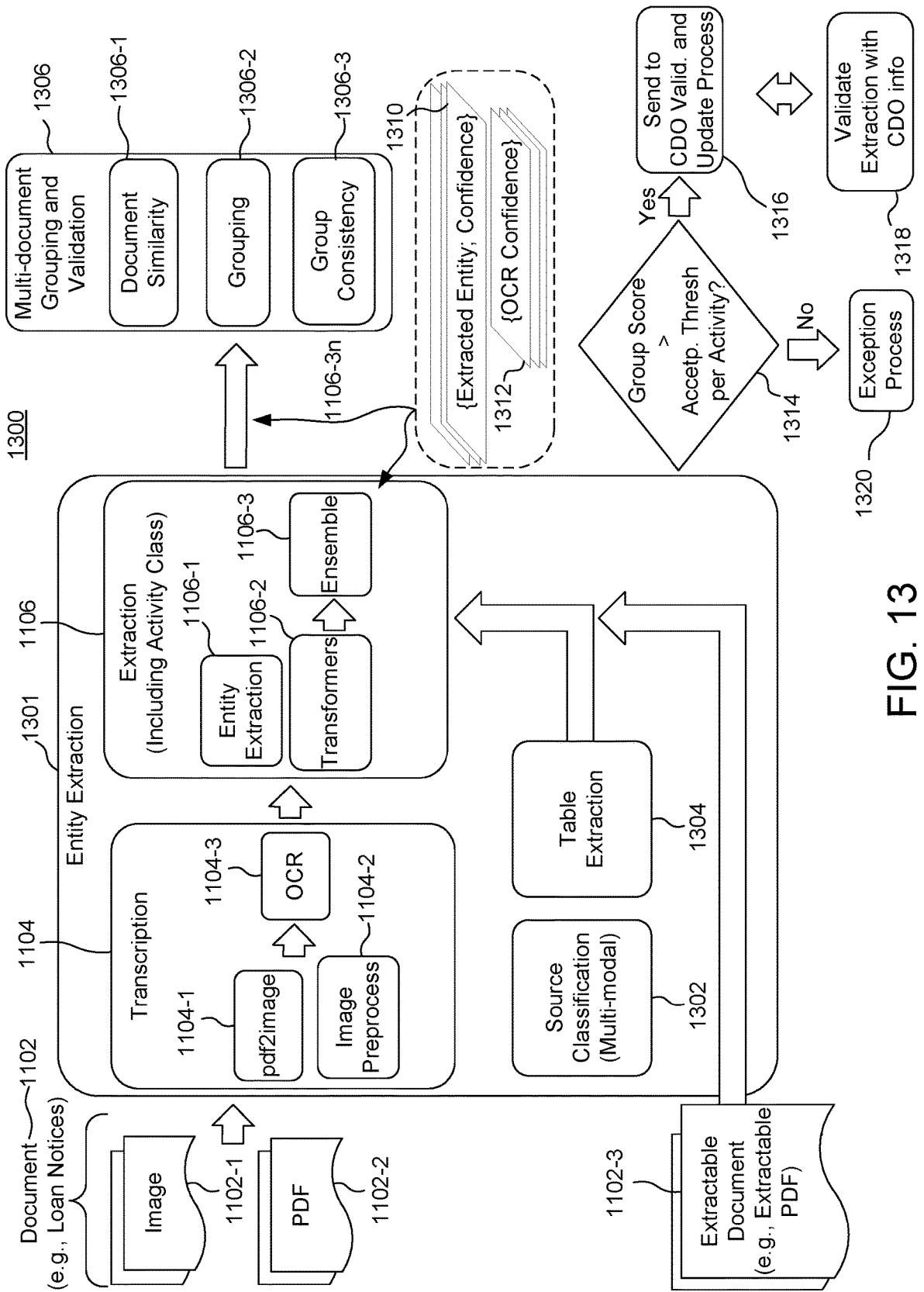
FIG. 13 illustrates an architecture and system flow for performing multiple document extraction and grouping according to an example embodiment.

FIG. 13 illustrates an architecture and system flow 1300 for performing multiple document extraction and grouping according to an example embodiment. Rather than perform the processes on a single document 1102 (e.g., a single loan notice), the processes depicted by FIG. 13 is applied to multiple documents to enable further features. Generally, the accuracy of the extracted entities is advantageously improved by comparing the same entities across several documents.

Transcription operation 1104 and entity extraction operation 1106 are similar to those described above in connection with FIG. 11.

The difference between the entity extraction operation 1101 of FIG. 11 and entity extraction operation 1301 of FIG. 13 is that the entity extraction operation 1301 operates on multiple documents and further performs a source classification operation 1302 and a table extraction operation 1304. Accordingly, entity extraction operation 1101 can be referred to as single document entity extraction operation 1101 and entity extraction operation 1301 can be referred to as multi-document entity extraction operation 1301.

As shown in FIG. 13, a source classification operation 1302 performs determining a type of document and/or a category of document from which the entities are being extracted. A type of document could be, for example, a loan application document which is in a specific format used for applying for a loan and/or a category of document could be, for example, loan notices which correspond to a category of documents related to loans from which the entities are being extracted. Loan notices can be generated by various sources, such as financial institution systems, credit bureau systems, or government agency systems, and can contain different types of information such as loan amounts, interest rates, payment schedules, and borrower information. Source classification operation 1302 identifies the origin of the loan notice and the type of information it contains, which can aid in the extraction of relevant entities. For example, if the loan notice comes from a financial institution, the entity extraction system may expect to find entities related to loan terms such as principal, interest rate, and payment schedule. On the other hand, if the loan notice comes from a credit bureau, the entity extraction system may expect to find entities related to the borrower's credit score or credit history.

By understanding the source of the loan notice and the type of information it contains, the entity extraction algorithms described herein can better identify relevant entities and improve their accuracy.

In some embodiments, the source classification operation 1302 is a multi-modal source classification operation performs categorizing loan notices based on multiple modalities or types of information, such as the text content, document structure, and visual features of the loan notice. For example, a loan notice may contain text that describes the loan terms and borrower information, but it may also have structured data such as tables or forms that provide additional details. In addition, the loan notice may have visual features such as logos, colors, or fonts that can provide clues about the source of the document. By analyzing multiple modalities of information in a loan notice, multi-modal source classification can help to more accurately identify the source and type of the loan notice, which in turn can improve the accuracy and relevance of entity extraction. For instance, the structured data may contain specific fields related to loan terms or borrower information that can be used to extract entities more accurately, while the visual features may provide additional context that can help to disambiguate entities with similar names or terms. Multi-modal source classification improves the performance of the entity extraction component 1106, particularly when dealing with diverse and complex types of loan notices.

In turn, a multi-document grouping and validation operation 1306 applies grouping and validation processes to the extracted entities. In an example embodiment, extracted entities from documents can be used in several natural language processing operations such as document similarity, document grouping, and group consistency. Document similarity operation 1306-1 uses the extracted entities to performing measuring the similarity between documents. In an example implementation, the extracted entities are represented as feature vectors, which can be compared using similarity measures such as cosine similarity or Jaccard similarity. The output of this operation is a similarity score or distance matrix that indicates how similar each pair of documents (e.g., notices) is based on their shared entities. Document grouping operation 1306-2 uses the extracted entities to perform grouping similar documents together by, for example, clustering together based on their similarity. Clustering together based on similarly is accomplished by, for example, using techniques such as k-means or hierarchical clustering. The output of this operation is a set of clusters, where each cluster contains documents that share similar entities or topics (e.g., rate of interest, deal name, date, facility name are common).

Group consistency operation 1306-3 uses the extracted entities to perform various reconciliation steps related to data quality and consistence. For example, this group consistency operation can perform three types of reconciliations: reconciliation of partial matches, reconciliation of formats, and flagging of any inconsistencies. The operation reconciles the extracted entities with how record elements are recorded in a system of record and ensures that the entities within each group are consistent with each other.

In some embodiments, the group consistency operation 1306-3 is performed within a window of time (e.g., 1-day, 2-days, 3-days, etc.).

In an example implementation, the confidence score in the {extracted entity:confidence score} pair 1310, also referred to simply as extracted entity confidence 1310 or extracted entity confidence score 1310, is a measure of how confident a natural language processing (NLP) system is in identifying a particular entity or information from text.

In some embodiments, one or both of the confidence scores are compared against a respective threshold. In an example implementation, the extracted entity confidence score 1310 and the OCR confidence score 1312 are combined to form a combined confidence score. An acceptance threshold operation 1314, in turn, performs comparing the combined confidence score (also referred to as a group confidence score or simply group score) to an acceptance threshold value. If a determination is made by the acceptance threshold operation 1314 that the combined confidence score meets the acceptance threshold value, an extracted entity transmission operation 1316 performs transmitting the extracted entity to a collateralized debt obligation (CDO) database for further processing and updating the underlying process associated with the transaction corresponding to the document as described above in connection with the single document entity extraction operation 1100.

In addition, a validation operation 1318 performs validating the extracted entity with the CDO information also as described above in connection with FIG. 11.

Figure 14:
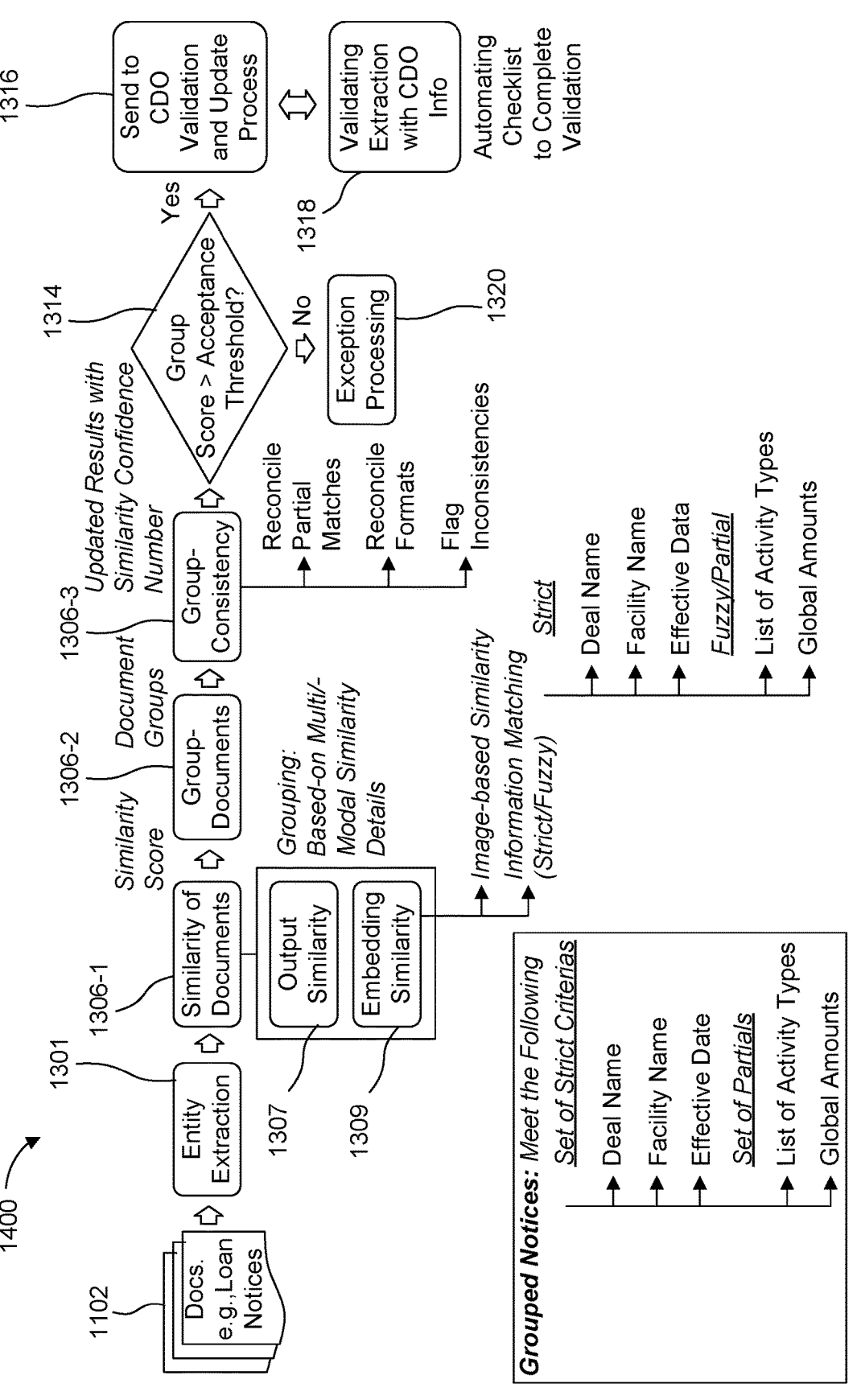
FIG. 14 illustrates an end to end extraction process using grouping based on matching primary (strict) and secondary (fuzzy/partial) matches.

FIG. 14 illustrates an end to end extraction process 1400 using grouping based on matching primary (strict) and secondary (fuzzy/partial) matches. It should be understood that while the example use case depicted in FIG. 14 involves loan notices, the embodiments described herein are not so limited.

In some embodiments, strict criteria are used to find all entities that have the same set of information. Group partial matches are also performed to match records and correct for discrepancies due to the OCR processing in the transcription operation (e.g., FIGS. 11 and 13, OCR operation 1104-3).

As explained above, document similarity detection operation 1306-1 performs measuring the similarity between documents. The output of this operation is a similarity score or distance matrix that indicates how similar each pair of documents is based on their shared entities. In some embodiments, document similarity detection operation 1306-1 includes an output similarity operation 1307 and an embedding similarly operation 1309.

Output similarity operation 1307 performs comparing and evaluating the similarity between outputs generated by different modalities or sources, such as text and image. In an example implementation, output similarity operation 1307 performs distance metrics calculations on the extracted entities. Once features are extracted, a distance metric is used to compare the similarity between the features of each modality. In an example implementation, distance metrics are calculated using Euclidean distance, cosine similarity, and Jaccard similarity. These metrics quantify the difference or similarity between the feature vectors, which can be used to determine the overall similarity between the outputs generated by different modalities.

Another implementation for performing output similarity is through the use of neural networks that are capable of processing multiple modalities simultaneously. Models are trained to extract meaningful representations from each modality and combine them to generate a joint representation of the output, which can be used to evaluate similarity.

In some embodiments document similarity detection operation 1306-1 includes an embedding similarly operation 1309. Embedding similarly operation 1309, in an example implementation, is achieved through the use of embeddings, which are low-dimensional representations of the inputs (e.g., entities that have been extracted using the techniques described herein) that capture their semantic meaning. Embeddings can be learned from the raw data or pre-trained on large datasets using deep learning models. To perform multi-modal similarity based on embeddings, the first step is to extract the embeddings for each modality. For example, text embeddings can be extracted using techniques like word2vec or GloVe, image embeddings using convolutional neural networks (CNNs), and audio embeddings using spectrograms or mel-frequency cepstral coefficients (MFCCs).

Once the embeddings are extracted, their similarities are computed using various distance metrics such as cosine similarity or Euclidean distance. To combine the similarities across different modalities, techniques such as averaging or weighted averaging can be used.

For example, text embeddings and image embeddings for a set of loan notice objects can be used to compute the similarity between them. In an example implementation, pairwise similarities between the text embeddings and image embeddings are computed. Next, these similarities are combined using weighted averaging, where weights are assigned to each modality based on its importance in the overall similarity score.

The final output of the (multi-modal) similarity operation would be a similarity matrix that represents the similarities between all pairs of objects across all modalities.

Once the similarity scores are obtained, a document grouping operation 1306-2 is performed. Document grouping operation 1306-2 uses the extracted entities to group documents by for example using an entity clustering process. Entity clustering involves grouping similar documents based on their shared entities or topics. In an example implementation, the entities that have been extracted from a document (e.g., a loan notice) are used to represent each document as a vector of entity mentions. This can be done by constructing a document-term matrix where the rows represent the documents, and the columns represent the entities. The cells in the matrix contain the frequency of the entity mentions in each document.

After constructing the document-term matrix, clustering algorithms such as k-means or hierarchical clustering are used to group the documents based on their entity mentions. These algorithms group the documents together based on the similarity of their entity vectors, where documents with similar entity mentions are grouped together.

The output of entity clustering is a set of clusters, where each cluster contains documents that share similar entities or topics. These clusters can be further analyzed to identify the most representative entities or topics in each cluster, which can be useful for understanding the content of the documents and extracting insights from the data.

In some embodiments, a group consistency operation 1306-3 is used to perform various reconciliation steps related to extracted entities. In an example implementation, this operation performs three types of reconciliations: reconciliation of partial matches, reconciliation of formats, and flagging of any inconsistencies.

Reconciliation of partial matches involves reconciling partially matching entities that may have been extracted differently from different sources or documents. For example, if an entity is mentioned in one source as "ABC Inc." and in another source as "ABC Corporation", the operation will reconcile these entities as being the same.

Reconciliation of formats involves reconciling entities that are represented in different formats or structures. For example, if one source lists an entity as "New York" and another source lists it as "NY", the operation will reconcile these entities as being the same.

Flagging of any inconsistencies involves flagging any inconsistencies or discrepancies in the extracted entities that could indicate errors or data quality issues.

The reconciliation steps of the group consistency operation 1306-3 are used to reconcile the extracted entities with how record elements are recorded in a system of record. This ensures that the extracted entities are aligned with the actual data stored in the system.

Group consistency operation 1306-3 thus ensures that the entities within each group are consistent with each other.

If the discrepancies in the reconciled entities are greater than an acceptable threshold for critical entities, the system may automatically perform exception processing. This means that the system will flag the discrepancies for further review and action.

As explained above in connection with FIG. 13, in some embodiments, one or both of the confidence scores are compared against a respective threshold. In an example implementation, the extracted entity confidence score 1310 and the OCR confidence score 1312 are combined to form a combined confidence score. An acceptance threshold operation 1314, in turn, performs comparing the combined confidence score to an acceptance threshold value. If a determination is made by the acceptance threshold operation 1314 that the combined confidence score meets the acceptance threshold value, an extracted entity transmission operation 1316 performs transmitting the extracted entity to a collateralized debt obligation (CDO) database for further processing and updating the underlying process associated with the transaction corresponding to the document as described above in connection with the single document entity extraction operation 1100.

In addition, a validation operation 1318 performs validating the extracted entity with the CDO information also as described above in connection with FIG. 11.

In machine learning, finetuning refers to the process of taking a pre-trained model and adapting it to a new, related task. Finetuning is often used when the available labeled data for the new task is limited, as it allows for leveraging the knowledge and representation learned from a pre-trained model on a related task to improve performance on the new task.

The general process of finetuning involves taking a pre-trained model and replacing the final layer(s) with new layer(s) that are specific to the new task. The weights of the pre-trained layers are typically frozen, while the weights of the newly added layers are initialized randomly and then trained on the new task. The frozen pre-trained layers act as feature extractors, providing the new layers with a rich representation of the input data.

Generally, a combination of models (in ensembles) along with appropriate hyperparameter tuning are implemented to provide accurate results. Particularly, a combination of the fine-tuning of base transformer models along with the use of embeddings derived from the transformer models and other language models (e.g., ELMo, Character-based, Flair) are used.

Aspects of the embodiments herein perform information extraction of documents (e.g., financial documents). A framework is provided to resolve tasks involved in the information extraction, such as named entity extractions, classification, question/answering. In some embodiments, the framework utilizes (i) unique embeddings that the transformers provide in recurrent networks and (ii) fine tuning pretrained transformer models so that task specific adaptations are trained. This framework has unique advantages. For example, ensembles that utilize both methods provide higher performance compared to using the more popular finetuning methods alone. Problems caused by OCR errors and the lack of domain specific vocabularies in pretrained transformer models, different entities exhibit better accuracies with either with the finetuning models or with feature based RNN methods.

In machine learning, a typical ensemble of models refers to a group of two or more individual models that are trained on the same dataset or different subsets of the same dataset with the goal of achieving better performance than any individual model. The basic idea behind conventional ensemble methods is that by combining the predictions of multiple models, the resulting prediction is often more accurate and robust than the prediction of any single model. The ensemble of models used in the embodiments described herein, however, do not combine the predictions of the individual models in an ensemble. Instead, all the unique individual model predictions are considered by ranking each model in the ensemble as a predictor for a particular entity. In turn, each model is weighted based on its accuracy.

More specifically, entities are extracted (via token classification and NER) or paragraphs (via sequence classification) from documents to prepare them for further processing, such as an audit or loan remediation. A combination of models is employed, including cascaded models that utilize a classification model followed by an NER model to narrow down paragraphs in the document that need token classification for a particular entity.

Each model is an ensemble of multiple models that extracts entities from documents. For example, BERT and RoBERTa models are used for named entity recognition, utilizing both finetuning and feature-based approaches.

Stochastic Gradient Descent (SGD) can then be used to update the weights of the pre-trained base models using a new set of documents, typically specific to a certain task. A pre-trained base model is usually a large language model, such as BERT or RoBERTa, that has been trained on a large corpus of text data using a self-supervised learning objective, such as predicting masked words or predicting the next sentence.

Finetuning involves taking the pre-trained base model and adding a task-specific output layer on top of it. This output layer is, in some embodiments, randomly initialized and trained on the new set of documents using SGD with backpropagation. During training, the weights of the base model are frozen, and only the weights of the output layer are updated.

The finetuning process typically involves a few epochs of training, during which the algorithm updates the weights of the output layer using the gradients of the loss function with respect to the weights. The loss function is computed based on the output of the model on the training data and the ground truth labels.

After finetuning, the entire model, including the pre-trained base model and the task-specific output layer, can be used for the new task. By finetuning the pre-trained base model on a specific task, the model can learn task-specific features that are relevant for the new task, while still retaining the general linguistic knowledge learned from the pre-training task.

In an example implementation, the weights of the base models are re-tuned using SGD with the loan documents in the finetuning method, while the models are used as published without changes to the weights and biases in the feature-based approach.

A biLSTM (bidirectional Long Short-Term Memory) can be incorporated to perform token classification using embeddings derived from the base models, such as the sum of the last four hidden layers, by first obtaining the embeddings from the base models, and then feeding them into the biLSTM network.

The embeddings from the base models can be concatenated together to form a single embedding for each token, and these concatenated embeddings can be fed into the biLSTM network. The biLSTM network can be trained to predict the entity label for each token, using the concatenated embeddings as input.

During training, the weights of the biLSTM network can be updated using backpropagation with respect to a loss function, such as cross-entropy loss, which measures the difference between the predicted entity labels and the true entity labels. The weights of the base models can also be updated during the training process using SGD, as described earlier.

In this way, the biLSTM network can use the embeddings derived from the base models to perform token classification, while also taking into account the contextual information provided by the biLSTM network. Each model is further an ensemble of multiple models that try to derive the entity from the document.

In an example implementation, in the finetuning method, the weights of the base BERT and RoBERTa models are retuned using SGD with loan documents. In a feature-based approach, the models are used as published without any changes to the weights and biases. In addition, a biLSTM is added to do the token classification using the embeddings obtained from the base models. Different options for extracting word embeddings from a model exist, such as using the last hidden layer or summing the last four hidden layers. Additionally, a character-based recurrent neural network can be used for named entity recognition, which can be used to derive additional embeddings.

In some embodiments, "stacking" can be used, where multiple embeddings from different sources (such as BERT and character-based embeddings) can be combined and used as input to a biLSTM with conditional random fields. This allows for the use of various embeddings in named entity recognition, potentially improving the performance of the model.

In this example embodiment, a solution approach for named entity recognition utilizes a combination of different embeddings in feature-based models. Specifically, the solution uses the mean of the first 'n' hidden layers of BERT or RoBERTa, the stack of the first 'n' layers of BERT or RoBERTa, ELMo embeddings, and Flair (character RNN) embeddings trained on newspaper data. Advantageously, the combination of these embeddings in both feature-based models and finetuning models provides a highly effective ensemble of models for named entity recognition.

In an example embodiment, named entity recognition (NER) models are trained using annotated text as the ground truth. The first step of the method involves obtaining a textual representation of the document as described herein (e.g., using OCR tools). Next, a sample set of the documents is annotated. Particularly, information that needs to be extracted is annotated, such as phrases like payment terms, payment requirements, and reporting requirements, in addition to the named entity recognition classes (Persons, Locations, Dates, and Numbers). The named entity recognition modules trained on noun-clauses used for token classification can be used for certain phrases when used in combination as an ensemble described below. Some annotations span more than a paragraph, requiring the use of classification models to extract them.

To prepare the annotated documents for finetuning with pre-trained NER and classification models, appropriate sequence boundaries are marked while adhering to a 512 limit for the maximum sequence length. Sequence boundaries are marked at each subclause rather than paragraphs. Additionally, a token-by-token comparison is performed to remove unwanted line breaks and maintain consistency in the annotated text file and corresponding tokenization using, for example, the ConLL-2003 format as input to the appropriate transformer tokenizer. The CoNLL-2003 format is a data format used in natural language processing (NLP) for representing annotated corpus. In the CoNLL-2003 format, each line of the input file represents a single word and consists of a series of tab-separated columns containing various types of information about that word, such as its surface form, part of speech, and named entity label. The named entity labels are typically represented using the IOB (Inside-Outside-Beginning) scheme, where each word is marked as being either inside a named entity, outside a named entity, or at the beginning of a named entity. The format also supports additional columns for other types of information, such as lemma, morphological features, and syntactic dependencies.

Descriptive statistics, such as the distribution of token length of all the paragraphs in the document, are used to split paragraphs and subclauses that exceed the maximum sequence length for fine-tuning models, while not splitting sequences for models utilizing feature extraction embeddings. The split may include preprocessing such as adding a sliding window and stride so that context is not lost.

As loan documents can span across 400-500 pages and have multiple occurrences of entity tokens, such as borrower names, it is almost certain that not all instances of the entity tokens are annotated, particularly if the annotation is performed by the experts. It is also impractical to expect that all annotations will be consistent, particularly if experts are generating the annotations. However, there is a high probability that the correct token will be annotated as the correct entity class, even though it may be annotated differently by different annotation mechanisms or different experts. This may pose a problem in traditional NER modeling, especially in the calculation of a loss function. Entities that are not annotated but are correctly picked by the model will be counted as false positives, and entities that are missed by the model but annotated will be marked as false negatives, even though the same entity, such as borrower name, has been positively identified at another occurrence in the document. In some embodiments, the token classification loss is modified slightly to select and persist model checkpoints that successfully classify a maximum number of tokens with true entity class. This means a model that classifies the greatest number of tokens of an entity, for example a "borrower name", correctly irrespective of the number of annotated occurrences will be selected when evaluated on development or test datasets.

In some embodiments, to improve speed and accuracy during training, randomly downsampling the training data and removing paragraphs that do not contain any annotated entity tokens is performed to provides a substantial improvement. Paragraphs can be downsampled through a roulette wheel selection, where the probability of downsampling a paragraph without tokens is directly proportional to the paragraph length. At each epoch, evaluation is done on the whole test and development data without any downsampling.

For extracting annotated paragraphs, a classifier model is trained using all the text in a given paragraph to create one record of the training data. The paragraph is labeled as 1 or 0 based on whether the subclause within the paragraph is annotated or not. This is done for all the paragraphs in a file, and then all the files are combined to create training and testing data. This data is, in turn, used to start the training process of the classification model, where pre-trained transformer models such as BERT and Roberta are used as base models and to finetune the classification pretrained models. While training, various checkpoints of the trained model along with the best model for evaluation are saved. Creating an ensemble of checkpoints with the final and best model significantly improves overall accuracy.

Truncating a paragraph at 512 tokens or splitting it into multiple paragraphs poses some challenges, such as the loss of context and misclassification. Information needed to correctly classify a specific entity or class of entities may not be concentrated in a single location or sentence within a paragraph, but rather spread out and scattered across multiple locations within the text. This can make it difficult for a model to correctly classify the entity if the paragraph is truncated or split into smaller sections, as important contextual information may be lost or split across multiple sections. To avoid this problem, a strided split is used where a token stride is obtained, and multiple smaller paragraphs are created from the original paragraph. For example, for a paragraph with a token length of 800 with strides of 300 tokens, three paragraphs of 512 or less in length are produced. This helps in preserving the context of the paragraph, and the model provided much higher accuracy.

In some embodiments, a cascaded model is implemented. In this approach, a paragraph is first classified, and then named entity extraction is performed using the set of classified paragraphs instead of all paragraphs in the document. This technique reduces the number of false positives for token classification, especially for entities that are not simple noun phrases and are ambiguously scattered across multiple paragraphs. However, the training procedures for these cascaded models still followed the same procedures as individual NER and classification models.

FIG. 15 illustrates an example ensemble framework 1500 according to an example embodiment. Voting ensemble weights are used in ensemble learning. In voting ensembles, the predictions of multiple models are combined using a voting scheme to make a final prediction. Each model in the ensemble is assigned a weight, which determines its contribution to the final prediction.

The weights can be used to assign more importance to certain models in the ensemble, based on their performance or other criteria. For example, if one model consistently performs better than the others, it can be assigned a higher weight to give it more influence in the final prediction.

The weights can be determined through various methods, such as cross-validation or grid search, and can be adjusted to improve the performance of the ensemble. The goal of assigning weights in a voting ensemble is to create a more accurate and reliable prediction by leveraging the strengths of multiple models. In some embodiments, an ensemble weights calculator 1502 operates to calculate a plurality of voting ensemble weights 1504 $a_{zn}$ for each entity(z) based on the performance of models $M_1$, $M_2$, . . . , $M_{n-1}$, $M_n$ in extracting each entity(z). In an example implementation, true annotated values and model predicted values obtained from test and development data sets 1506 are applied to models $M_1$, $M_2$, . . . , $M_{n-1}$, $M_n$. to generate the voting ensemble weights 1504 $a_{zn}$. In an example use case, entity(z) represents a particular topic. In some embodiments, the ensemble weights calculator 1502 further operates to calculate a true positive rate (TPR) for each entity(z) and each model $M_1$, $M_2$, . . . , $M_{n-1}$, $M_n$. The TPR, in an example implementation, is calculated by comparing a true annotation and a predicted value using an algorithm for measuring the difference between sequences of characters (e.g., strings). For example, the comparison of the true annotation and the predicted value can be performed using a Levenshtein distance operation. Levenshtein distance, also known as edit distance, is a measure of the difference between two sequences of characters, usually strings. Levenshtein distance can be used to determine how similar two words are. It is defined as the minimum number of single-character edits (insertions, deletions, or substitutions) required to transform one string into the other.

Typically, an ensemble is used to combine multiple models to improve the performance of the overall prediction. Each model in the ensemble makes its own predictions, and the final prediction is calculated by aggregating the predictions from all models using a set of weights. However, aspects of the embodiments described herein take a starkly different approach by not aggregating the predictions from all the models. Instead, for inferencing, all the unique individual model predictions are considered. In some embodiments, a prediction value for each of a plurality of models is obtained for a particular entity (z). The optimal value for each entity(z) is obtained by selecting a prediction value for a model from the plurality of models having the maximum confidence score for that particular entity (z). In other words, aspects of the embodiments described herein disaggregate models $M_1$, $M_2$, . . . , $M_{n-1}$, $M_n$ and determine how accurate each model $M_1$, $M_2$, . . . , $M_{n-1}$, $M_n$ is ranked as a predictor for a particular entity (z) (e.g., a particular topic), and weights each model based on that accuracy.

In some embodiments, if two or more models have confidence scores for that particular entity(z) that are within a predetermined threshold and the two or more models have confidence scores higher than the other models, then the optimal value for each entity (z) is obtained by selecting the aggregate of the two or more models having confidence scores higher than the other models for that particular entity (z).

In some embodiments, if two or more models have confidence scores for that particular entity (z) that are within a predetermined threshold and the two or more models have confidence scores higher than the other models, then the optimal value for each entity(z) is obtained by selecting one model of the two or more models. The selected model can be selected based on test accuracy scores for that particular entity (z).

As shown in FIG. 15, a weighted ensemble is computed to output both the entity and its confidence value. In an example embodiment, an entity weight $a_{z_n}$ is transformed using classification logic to compute the confidence value, where the confidence value is dynamic in nature.

In an example implementation, initially, $w_{i,j}$ is defined as a weight equal to metric (recall/F1/precision) of $i^{th}$ entity by $j^{th}$ model calculated for the test data. During inferencing each of the models may generate a different candidate output for an entity. For example, given i="borrower name" entity, models j=1 through j=4 may generate "John Smith" as candidate while models j=5 and j=6 my generate "Jane Doe" as the candidate. First, an ensemble score is calculated according to equation (1) as follows:

$$s_{i,k} = \sum_{j=1}^{m} \left( w_{i,j} \mathbb{1}_{j,k} \right)$$

where $s_{i,k}$ is defined as the score of the $i^{th}$ entity and $k^{th}$ candidate. $\mathbb{1}_{j,k}$ is an indicator of whether the model j produced a candidate output k. ($\mathbb{1}_{j,k}$ would be 1 for k="John Smith" and j=1 through 4 in the above example). In certain embodiments, the ensemble score alone would determine a candidate which would be the output of the ensemble. In other embodiments, the weights $w_{i,j}$ would further be refined by a scaling factor (e.g., ½) for each subsequent model 'j' predicting the same candidate. The resulting ensemble score would determine the output of the ensemble.

A static scaled confidence score $c_{j,k}$ is a measure of the level of confidence or certainty in a prediction of candidate k made by a machine learning model, j. It is a single number that represents the model's estimate of the probability that a particular prediction or classification is correct. The term "static" indicates that the confidence score is calculated based on a single prediction or classification, rather than being updated over time as new data is collected. The term "scaled" indicates that the confidence score is typically scaled to a range between 0 and 1, with 0 indicating no confidence or certainty, and 1 indicating complete confidence or certainty. In addition to the raw score calculated based on weights, static scaled confidence scores could be used to obtain a quantitative measure of the reliability of an ensemble's predictions, particularly to assess the performance of different models or to identify cases where a model may be making unreliable predictions. As explained above, ensemble methods typically involve combining multiple models to improve the overall accuracy and robustness of predictions. An ensemble confidence score, which is an enhancement of the ensemble score, can be computed by aggregating the predictions of the individual models, their performance during testing phase and their confidence in the current prediction and computing a measure of the level of agreement or consensus among them. There are various methods for computing ensemble confidence scores, such as using the average or median of the individual confidence scores or using a more complex method that considers the diversity and accuracy of the individual models. In an example implementation, the ensemble confidence score is calculated according to equation (2) as follows:

$$s_{i,k} = \sum_{j=1}^{m} \left( w_{i,j} \mathbb{1}_{j,k} c_{j,k} \right)_i$$

In some embodiments, the ensemble score and the ensemble confidence score together would determine the candidate predicted by the ensemble.

The above calculations allow for a more robust and reliable prediction than what can be achieved by a single model. By combining the predictions of multiple models, ensemble methods can reduce the risk of overfitting to the training data and improve the generalization performance of the model on unseen data. The ensemble confidence score can provide a measure of the overall reliability and confidence in the ensemble's predictions.

An entity-specific ensemble is a machine learning technique that is used for extracting named entities from text. In an entity-specific ensemble, multiple models are trained to identify specific types of entities. Rather than basing the overall result on the input text as a whole, however, aspects of the embodiment use an entity-specific ensemble that bases the result on the individual entity being extracted. Each model in the ensemble is responsible for a specific type of entity or a specific entity, and the results from each model are weighted according to the specific entity. This is distinct from typical (or generic) ensembles that combined to produce a final result.

In some embodiments, a pre-trained BERT (Bidirectional Encoder Representations from Transformers) model is finetuned for a specific natural language processing (NLP) task. In the example use cases described below, the BERT model is finetuned on loan documents. In an example implementation, data for the specific task of entity extraction is performed by collecting and preprocessing the text data, converting the text into tokens, and creating data splits for training, validation, and testing. In turn, the pre-trained BERT model is loaded. Next a task-specific layer is added on top of the pre-trained BERT model, which is based on the task of entity extraction and can be a classification or regression layer. In turn, the model is finetuned by training it on the task-specific data. During training, the weights of the pre-trained BERT model are updated along with weights of the task-specific layer. Lastly, the finetuned model is used to make predictions on new data.

Finetuning a RoBERTa (Robustly Optimized BERT Pretraining Approach) model follows a similar process to finetuning a BERT model, with the key difference being that RoBERTa uses a different pre-training approach that has been optimized for better performance on downstream tasks.

Flair and ELMo are two popular language models used for natural language processing (NLP) tasks. Flair is an open-source NLP library that includes a pre-trained language model that can be fine-tuned on specific NLP tasks such as text classification and named entity recognition. Flair's language model is a character-based LSTM (long short-term memory) neural network that uses a forward and backward pass over the input text to capture contextual information. Flair also provides a variety of embeddings, such as contextual string embeddings and BERT embeddings, that can be used in downstream NLP tasks.

ELMo (Embeddings from Language Models) is a deep contextualized word representation model that uses a bidirectional LSTM network to generate word embeddings that capture the context in which each word appears. These embeddings can be used as input to other NLP models such as text classifiers and named entity recognizers, improving their performance by providing more accurate representations of the input text. ELMo embeddings can be fine-tuned for specific NLP tasks or used as pre-trained embeddings for downstream models.

Figure 16:
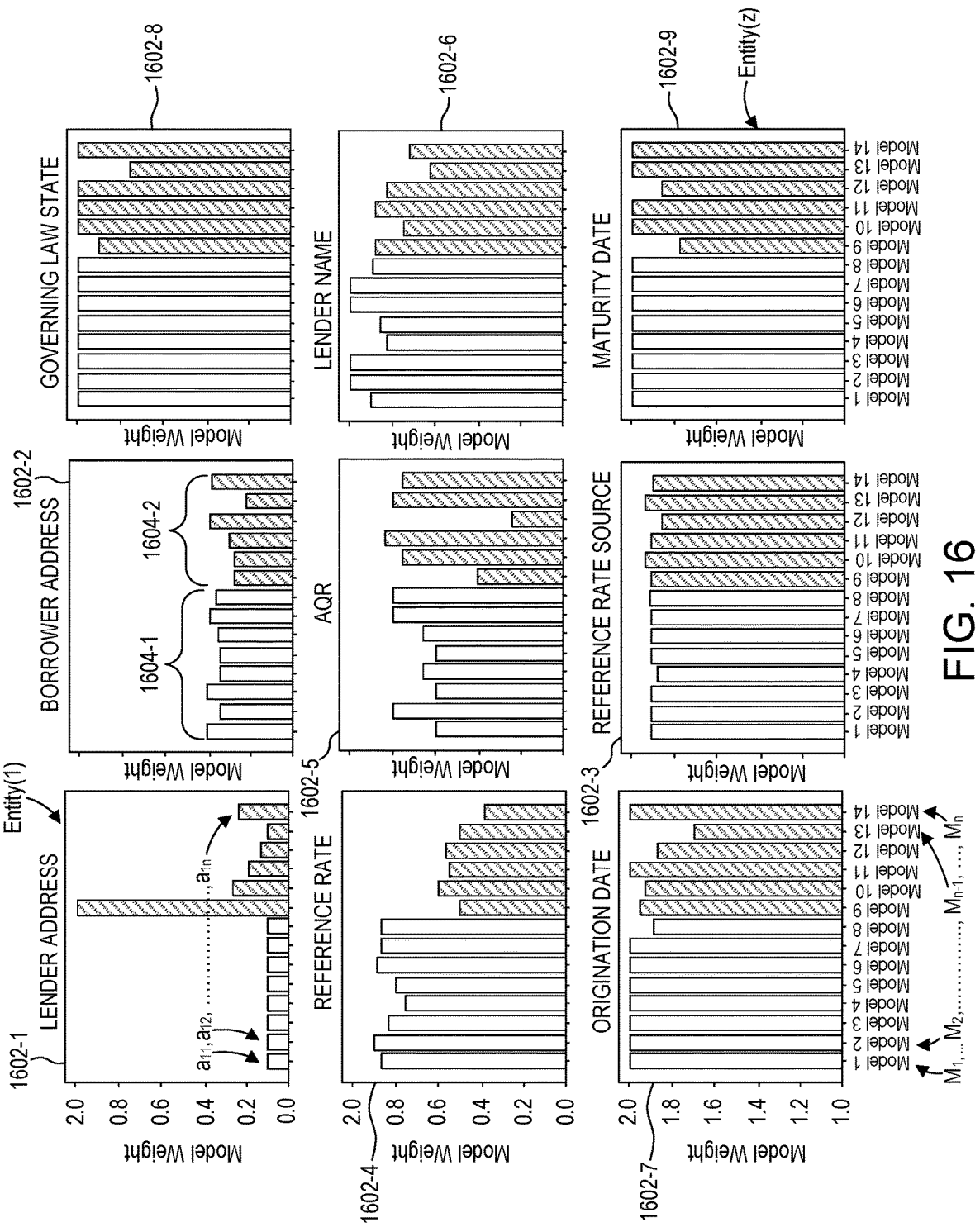
FIG. 16 is a graph illustrating an application of the ensemble framework according to an example embodiment.

FIG. 16 is a graph illustrating an application of the ensemble framework according to an example embodiment. FIG. 16 particularly depicts for illustrative purposes how each of a predetermined number of models performs on different entities entity$_1$, entity$_2$, . . . , entity$_z$ in a document. In an example use case, an ensemble of models is created for a predetermined type of document, in this example a loan notice document having entities named Lender Address, Borrower Address Governing Law State, Borrower Name, Assessment Time, Reference Rate, and the like. As shown in FIG. 16, a determination has been made for the first entity 1602-1 ("Lender Address") that the ninth model ("Model 9") has the highest confidence value for being able to extract an entity corresponding to the first entity 1602-1 and the other models, Models 1-8 and 9-14, do not perform well when extracting the first entity 1602-1. That is, the ninth model ("Model 9") provides a correct extracted entity:value pair result more often than not when extracting the first entity. Thus, for that particular entity (first entity 1602-1; Lender Address) that particular model (i.e., the ninth model) will be used. This is the case no matter which document is searched.

However, for the second entity 1602-2 ("Borrower Address"), each of the predetermined number of models Model 1-14) has only about a 40% confidence level that each will correctly extract the second entity (e.g., the models are expected to predict the correct answer approximately 40% of the time). It may be the case, however, that the extraction accuracy for the entity is much higher. FIG. 17 illustrates a table showing extraction accuracy for a plurality of entities, according to an example embodiment. The accuracy depicted in FIG. 17 is the percentage (%) of documents where the entities were corrected selected. As shown in FIG. 17, the accuracy for the second entity 1602-2 is 91%. This could mean that in some of the documents, a first set of the predetermined number of models 1604-1 provides accurate results for one or more fields (e.g., street address) in the second entity 1602-2 in some documents and a second set of the predetermined models 1604-1 provides accurate results for one or more other fields (e.g., city and state) associated with the second entity 1602-2 for other documents. In some embodiments, where the confidence levels for the models are within a predetermined threshold, the models are all given approximately the same weight. For example, referring to FIG. 15, if models $a_{21}$, $a_{22}$, . . . , $a_{2n}$ refer to weights corresponding to models 1-14 in FIG. 16 and as applied to the second entity 1602-2 of FIG. 16, each of the models would be given approximately the same weight. In some embodiments, plural sets of models that perform well for a particular entity are mapped to certain fields of the entity, so that when a document is processed, the set from the two or more sets of the plural models that performs the best is used. Thus, in some use cases, all of the models (e.g., an ensemble of Models 1-14) are not used to extract an entity. In some use cases, fewer than all of the models are used to extract the entity.

In another example, a third entity 1602-3 ("Maturity Date"), all of the models, Models 1-14 provide a high confidence that each will extract the third entity 1602-3 accurately.

In some embodiments, a system is provided for performing entity extraction, improving the accuracy and effectiveness of entity extraction processes. The system comprises various components, including a storage device, a plurality of models, a determination module, a selection module, and optionally, an extraction module and a calculation module.

The storage device in the system is responsible for storing a plurality of voting ensemble weights. These weights represent the importance assigned to each model within the ensemble and facilitate the determination of accurate predictions during the entity extraction process.

The plurality of models within the system are specifically trained to extract a first entity. Each model is designed to process data and generate a prediction value for the first entity. The determination module, part of the system, is configured to determine a first entity prediction value for each of the plurality of models. Consequently, a plurality of first entity prediction values is obtained, providing multiple predictions for the first entity.

To identify the prediction among the plurality of first entity prediction values, the selection module is incorporated into the system. The selection module selects a first model that has the highest prediction value among the plurality of first entity prediction values. This selection process enables the extraction of the first entity to be based on the most effective model within the ensemble.

In some embodiments, an extraction module is included in the system. The extraction module is responsible for extracting an entity:value pair corresponding to the first entity from a document. It utilizes a first ensemble weight associated with the first model to perform the extraction, ensuring the retrieval of relevant and accurate information.

Additionally, the system can handle the extraction of multiple entities. In such cases, a determination module is configured to determine a second entity prediction value for each of a plurality of models trained to extract a second entity. Similarly, a selection module selects a second model with the highest prediction value among the plurality of second entity prediction values. The extraction module then extracts entity:value pairs corresponding to both the first and second entities using the respective ensemble weights associated with each model.

In further embodiments, the system incorporates additional selection and extraction functionalities. For instance, the selection module can select a second model with a prediction value within a predetermined threshold of the first model. The extraction module subsequently extracts an entity:value pair corresponding to the first entity using the first ensemble weight associated with the first model and the second ensemble weight associated with the second model.

Furthermore, the system can include a calculation module responsible for calculating a plurality of voting ensemble weights for each model in the ensemble. These weights are determined based on the performance of each model, as measured by accuracy. This calculation enables the weights assigned to each model reflect their predictive capabilities more accurately.

The selection module, in certain embodiments, determines a confidence score for each of the plurality of models trained to extract the first entity. By considering these confidence scores, the selection module can select the first model with the highest confidence score among the plurality of first entity prediction values. This approach further enhances the accuracy and reliability of the selected model for entity extraction.

In some embodiments, the present disclosure includes a computer program product which is a non-transitory storage medium or computer-readable medium (media) having instructions stored thereon/in which can be used to program a computer to perform any of the processes of the present. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present disclosure has been provided for the purposes of illustration and description. It is not intended to be exhaustive or to limit the disclosure to the precise forms disclosed. Many modifications and variations will be apparent to the practitioner skilled in the art.

A person of skill in the art, having benefit of this disclosure, may recognize various ways for implementing technology described herein. The person of skill in the art may use any of a variety of programming languages (e.g., a C-family programming language, PYTHON, JAVA, RUST, HASKELL, other languages, or combinations thereof) and libraries (e.g., libraries that provide functions for obtaining, processing, and presenting data). Example libraries include NLTK by Team NLTK (which provides natural language functionality), PYTORCH by META (which provides machine learning functionality), and NUMPY by the NUMPY Developers (which provides mathematical functions), among others. Operating systems (e.g., WINDOWS or LINUX based operating systems) may provide their own libraries or application programming interfaces useful for implementing aspects described herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for performing entity extraction, comprising:
storing a plurality of voting ensemble weights;
determining a first entity prediction value for each of a plurality of models trained to extract a first entity, thereby determining a plurality of first entity prediction values;
selecting a first model having the highest prediction value of the plurality of first entity prediction values to extract a first entity:value pair type;
extracting, from a document, an entity:value pair corresponding to the first entity using a first ensemble weight associated with the first model, the entity:value pair including the first entity:value pair type; and
designating the first model to extract the first entity:value pair type from additional documents.

2. The method according to claim 1, further comprising:
determining a second entity prediction value for each of the plurality of models, wherein the plurality of models have been trained to extract a second entity, thereby determining a plurality of second entity prediction values;
selecting a second model having the highest prediction value of the plurality of second entity prediction values;
extracting, from the document, an entity:value pair corresponding to the second entity using a second ensemble weight associated with the second model.

3. The method of claim 1, further comprising:
selecting a second model having a prediction value within a predetermined threshold of the first model,
wherein extracting, from the document, the entity:value pair corresponding to the first entity further includes using a second ensemble weight associated with the second model.

4. The method of claim 1, wherein the entity:value pair is a first entity:value pair and the method further comprises:
selecting a first set of models, each of the models in the first set of models having a prediction value within a predetermined threshold of the first model, and wherein the first set of models include the first model;
selecting a second set of models, wherein the second set of models does not include a model in the first set of models; and
extracting, from a document, a second entity:value pair corresponding to the first entity using one or more ensemble weights associated with the second set of models,
wherein extracting, from the document, the first entity:value pair corresponding to the first entity includes using one or more ensemble weights associated with the first set of models.

5. The method of claim 1, further comprising:
calculating the plurality of voting ensemble weights for each of the plurality of models in a voting ensemble based on the performance of each of the plurality of models measured by accuracy.

6. The method of claim 1, wherein selecting the first model further comprising:
determining a confidence score for each of the plurality of models trained to extract the first entity; and
selecting the first model with the highest confidence score among the plurality of first entity prediction values.

7. The method of claim 1, further comprising:
entering into a loan agreement with a borrower; and
sending the borrower a loan notice document regarding the loan agreement,
wherein the entity is an entity selected from the group consisting of: a loan amount of the loan, a date associated with the loan, an interest rate of the loan, one or more repayment terms of the loan, a facility name associated with the loan, a fee associated with the loan, and a penalty associated with the loan.

8. A system for performing entity extraction, comprising:
a storage device storing a plurality of voting ensemble weights;
a plurality of models trained to extract a first entity;
one or more processors; and
a non-transitory computer-readable storage medium encoding instructions which, when executed by the one or more processors, causes the one or more processors to:

determine a first entity prediction value for each of the plurality of models, thereby determining a plurality of first entity prediction values; and select a first model having the highest prediction value of the plurality of first entity prediction values to extract a first entity:value pair type; and designate the first model to extract the first entity:value pair type from one or more documents.

9. The system according to claim 8, wherein the instructions further cause the one or more processors to:

determine a second entity prediction value for each of a plurality of models trained to extract a second entity, thereby determining a plurality of second entity prediction values;

select a second model having the highest prediction value of the plurality of second entity prediction values; and extract, from a document, an entity:value pair corresponding to the first entity using a first ensemble weight associated with the first model and to extract, from the document, an entity:value pair corresponding to the second entity using a second ensemble weight associated with the second model.

10. The system according to claim 8, wherein the instructions further cause the one or more processors to:

select a second model having a prediction value within a predetermined threshold of the first model; and extract, from a document, an entity:value pair corresponding to the first entity using a first ensemble weight associated with the first model and a second ensemble weight associated with the second model.

11. The system according to claim 8, wherein the instructions further cause the one or more processors to:

select a first set of models, each of the models in the first set of models having a prediction value within a predetermined threshold of the first model, wherein the first set of models includes the first model;

select a second set of models, wherein the second set of models does not include a model in the first set of models;

extract, from a document, a first entity:value pair corresponding to the first entity using one or more ensemble weights associated with the first set of models; and extract, from the document, a second entity:value pair corresponding to the first entity using one or more ensemble weights associated with the second set of models.

12. The system according to claim 8, wherein the instructions further cause the one or more processors to:

calculate a plurality of voting ensemble weights for each of the plurality of models in a voting ensemble based on the performance of each of the plurality of models measured by accuracy.

13. The system of claim 8, wherein the instructions further cause the one or more processors to:

determine a confidence score for each of the plurality of models trained to extract the first entity; and select the first model with the highest confidence score among the plurality of first entity prediction values.

14. A non-transitory computer-readable medium having stored thereon one or more sequences of instructions for causing one or more processors to perform:

storing a plurality of voting ensemble weights;

determining a first entity prediction value for each of a plurality of models trained to extract a first entity, thereby determining a plurality of first entity prediction values;

selecting a first model having the highest prediction value of the plurality of first entity prediction values to extract a first entity:value pair type; and designating the first model to extract the first entity:value pair type from one or more documents.

15. The non-transitory computer-readable medium of claim 14, further having stored thereon a sequence of instructions for causing the one or more processors to perform:

extracting, from a document, an entity:value pair corresponding to the first entity using a first ensemble weight associated with the first model.

16. The non-transitory computer-readable medium of claim 14, further having stored thereon a sequence of instructions for causing the one or more processors to perform:

determining a second entity prediction value for each of the plurality of models, wherein the plurality of models have been trained to extract a second entity, thereby determining a plurality of second entity prediction values;

selecting a second model having the highest prediction value of the plurality of second entity prediction values;

extracting, from a document, an entity:value pair corresponding to the first entity using a first ensemble weight associated with the first model;

extracting, from the document, an entity:value pair corresponding to the second entity using a second ensemble weight associated with the second model.

17. The non-transitory computer-readable medium of claim 14, further having stored thereon a sequence of instructions for causing the one or more processors to perform:

selecting a second model having a prediction value within a predetermined threshold of the first model; and extracting, from a document, an entity:value pair corresponding to the first entity using a first ensemble weight associated with the first model and a second ensemble weight associated with the second model.

18. The non-transitory computer-readable medium of claim 14, further having stored thereon a sequence of instructions for causing the one or more processors to perform:

selecting a first set of models, each of the models in the first set of models having a prediction value within a predetermined threshold of the first model, and wherein the first set of models include the first model;

selecting a second set of models, wherein the second set of models does not include a model in the first set of models;

extracting, from a document, a first entity:value pair corresponding to the first entity using one or more ensemble weights associated with the first set of models; and extracting, from the document, a second entity:value pair corresponding to the first entity using one or more ensemble weights associated with the second set of models.

19. The non-transitory computer-readable medium of claim 14, further having stored thereon a sequence of instructions for causing the one or more processors to perform:

calculating the plurality of voting ensemble weights for each of the plurality of models in a voting ensemble based on the performance of each of the plurality of models measured by accuracy.

20. The non-transitory computer-readable medium of claim 14, further having stored thereon a sequence of instructions for causing the one or more processors to perform:

determining a confidence score for each of the plurality of models trained to extract the first entity; and selecting the first model with the highest confidence score among the plurality of first entity prediction values.

* * * * *